United States Patent [19]
Brauer

[11] Patent Number: 5,611,503
[45] Date of Patent: Mar. 18, 1997

[54] OPTIMAL AIRPLANE PASSENGER SEATING CONFIGURATIONS AND METHODS THEREFOR

[75] Inventor: Robert K. Brauer, Seattle, Wash.

[73] Assignee: The Boeing Company, Seattle, Wash.

[21] Appl. No.: 135,704

[22] Filed: Oct. 13, 1993

[51] Int. Cl.$^6$ .......................... B61D 33/00; B64D 11/06
[52] U.S. Cl. .................... 244/118.6; 244/118.5; 105/344
[58] Field of Search ............ 244/118.5, 118.6, 244/122 R, 118.1; 105/344, 345; 296/64

[56] References Cited

U.S. PATENT DOCUMENTS

| | | | |
|---|---|---|---|
| 3,374,032 | 3/1968 | Del Giudice | 244/122 R |
| 3,877,747 | 4/1975 | Brennan et al. | 244/122 R X |
| 4,030,688 | 6/1977 | Pellarini | 244/118.5 X |
| 4,066,227 | 1/1978 | Buchsel | 244/118.6 |
| 4,382,628 | 5/1983 | Palmgren | 244/118.6 X |
| 4,881,702 | 11/1989 | Slettebak | 244/118.6 |
| 4,936,620 | 6/1990 | Francois et al. | 296/64 |
| 5,086,996 | 2/1992 | Roeder et al. | 244/119 |
| 5,104,065 | 4/1992 | Daharsh et al. | 244/122 R X |
| 5,131,607 | 7/1992 | Arnold et al. | 244/122 R X |
| 5,178,345 | 1/1993 | Peltola et al. | 244/118.6 |
| 5,180,120 | 1/1993 | Simpson et al. | 244/118.6 |
| 5,193,765 | 3/1993 | Simpson et al. | 244/118.6 |

FOREIGN PATENT DOCUMENTS

| | | |
|---|---|---|
| 0408432 | 1/1991 | Germany. |
| 0514650A1 | 11/1992 | Germany. |
| 4209037A1 | 9/1993 | Germany. |

OTHER PUBLICATIONS

Aviation Week & Space Technology, Feb. 21, 1966, pp. 38–39.
Aviation Week and Space Technology "Boeing Designs 747 For Future Growth" by Richard G. O'Love, p. 41, Apr. 18, 1966.
"Interior Arrangement Comparisons": 747–400, The Boeing Company, Oct. 25, 1991, (Attach. 1).
"Comparable Seating", The Boeing Company, Aug. 30, 1991, (Attach. 2, pp. 1,2).
Air Transport World, "'Planezilla': Mighty Technical Challenge", by Bill Sweetman, pp. 74, 75, 77 and 78, 5–93, (Attach. 3).
"What is Comfort", Airbus Brochure, circa Jun. 1993, (Attach. 4).
Lufthansa press release: "World's newest, most advanced airliner begins service from Atlanta", Sep. 3, 1993 (Attach. 5).

(List continued on next page.)

*Primary Examiner*—Andres Kashnikow
*Assistant Examiner*—Virna Lissi Mojica
*Attorney, Agent, or Firm*—W. C. Anderson; R. L. Gullette; B. A. Donahue

[57] ABSTRACT

A process for arranging seats within an airplane to provide optimal combinations of passenger comfort and space utilization. The process involves calculating the average passenger comfort level in each possible row configuration using the comfort levels enjoyed by passengers seated in different seating environments created by adjacent occupied seats, empty seats, sidewalls and aisles, each such comfort level being weighted by the portion of passengers who would be seated in the seating environments at each possible load factor and the frequency of occurrence of that load factor. The row configuration with the highest passenger comfort level may be installed in the airplane. The results of this optimization can be either (i) enjoyed by passengers in the form of greater comfort at average load factors, (ii) used to increase the number of passenger seats in the airplane without reducing average passenger comfort at average load factors or increasing airplane size, or (iii) used to reduce the overall dimensions of an airplane without reducing the number of seats in the airplane or reducing average passenger comfort at average load factors.

23 Claims, 15 Drawing Sheets

OTHER PUBLICATIONS

Volare, Jun. 1992, p. 41, showing seating configurations for B787, ASX 700, B747–400, MD 12, and UHCA designs.

"*Product Line Review,*" Airbus Industrie, A1/CM–T 316.0018 Issue, 4, Jul. 1993 (3 pages).

Hellmut Penner/Dietmar Plath, "*Airbus International,*" Motorbuch Verlag Stuttgart (3 pages).

"*World's Newest, Most Advanced Airliner Begins Service From Altanta,*" Lufthansa Press and Public Information, New York, Copyright 1993 Business Wire (2 pages).

Adam Brown, "*Product Positioning & Future Developments,*" A Presentation To the Technical Press by Adam Brown, Vice President—Strategic Planning, Airbus Industrie, Toulouse, 8th Jun. 1994, (2 pages).

Ernst Deissinger, "*Mit Dem Riesenjumbo Ins Nahst Jahrtausend*", P. M. Peter Moosleitners Interessants Magazin, Jun. 1993; 21. Mai 1993; DM 6,00; C58 44 E.

Richard L. Lankford and Eduard I. Pina, "*Method for Analysis, Management, and Marketing of Scheduled Airline Capacity,*" 1977 Joint ORSA/TIMS Meeting, Peachtree Plaza Hotel, Atlanta, Georgia, Nov. 7–9, 1977, Boeing Commercial Company, p. 1–7.

*Discount Fair Management,* W6299, Oct. 1977, Printed in USA, pp. 1–8.

"*U.S. Major Carriers, Jan.–Dec., 1994*", May 1959 Air Transport World, p. 113.

"*In–Flight Survey Questionnaire Handbook,*" Boeing Commercial Airplane Company (A Division of The Boeing Company) Seattle, WA 98124, USA, Feb. 1982, Printed in USA, L10890, pp. 1–32.

*Airworthiness Standards: Transport Category Airplanes, Part 25,* pp. D–26 & D–27.

"*Airlines Operating Eight Abreast Economy Class Configured 2/4/2—as of Year–End 1993*", (2 pages).

OPTIMAL AIRPLANE PASSENGER SEATING CONFIGURATIONS AND METHODS THEREFOR

FIELD OF THE INVENTION

The present invention generally relates to the arrangement of passenger seats in an airplane. More particularly, this invention relates to passenger seating configurations and methods for determining such seating configurations that at typical occupancy levels maximize passenger comfort in seats of any given dimensions. Even more particularly, this invention provides methods that either (i) increase passenger seating comfort levels in an airplane of fixed dimensions and number and type of seats, (ii) maximize the number of passenger seats in an airplane of fixed dimensions and seat type while maintaining original passenger comfort levels, or (iii) decrease airplane dimensions for substantially the same number of passengers at substantially the same original comfort levels with the same seat type.

BACKGROUND OF THE INVENTION

Commercial airlines and airplane manufacturers seek to arrange passenger seats in ways that maximize the revenue-earning potential of airplanes while minimizing operating costs per passenger seat. For existing airplane models, seats are arranged with the objective of maximizing passenger comfort without reducing the number of seats, or of maximizing the number of seats at a given level of passenger comfort. In designing new airplanes seating arrangements ideally should minimize the dimensions of the airplane (and the resulting weight and aerodynamic drag) to accommodate a given number of seats at a given comfort level.

Payloads engineers are normally responsible for designing seating configurations in modern airplanes and to achieve the above goals. With respect to the arrangement of seats in each row, payloads engineers assume that overall passenger comfort is maximized by minimizing the number of seats between any passenger and the nearest aisle. Among practical configurations, those in which no passenger is more than one seat away from the nearest aisle are chosen since they are considered ideal.

For existing eight-abreast configurations having two aisles, this rule has resulted in the use of a 2\4\2 seating configuration (where a backslash (\) represents the position of an aisle and numerals are used to indicate the number of seats (not necessarily occupied by passengers) in each seating unit). The seating arrangements of U.S. Pat. Nos. 4,066,227, issued Jan. 3, 1978, to Buchsel; 4,881,702, issued Nov. 21, 1989, to Slettebak; 4,936,620, issued Jun. 26, 1990, to Francois et al.; 5,178,345, issued Jan. 12, 1993, issued to Peltola et al., and 5,180,120, issued Jan. 19, 1993, to Simpson, et al., observe these principles.

However, in contrast with the present invention, conventional configurations have failed to either maximize passenger comfort in seats of any given dimensions, maximize passenger comfort in an airplane of fixed dimensions and number and type of seats, maximize the number of passenger seats in an airplane of fixed dimensions and seat type while maintaining original passenger comfort levels, or minimize airplane dimensions for substantially the same number of passengers at substantially the same original comfort levels.

These objectives have not been achieved by the prior art because neither the percentage of available seats which are typically filled (load factor) in airline service, nor the specific seats which are filled in each possible configuration at various load factors, nor the different levels of comfort experienced by passengers seated in the different seating environments created by adjacent occupied seats, empty seats, sidewalls and aisles, have been taken into account.

In contrast, the present invention provides a unique and unobvious process for determining and maximizing the additional comfort enjoyed by passengers as a result of being seated beside occupied seats, empty seats, sidewalls and/or aisles under realistic load conditions using conventional seat assignment procedures.

SUMMARY OF THE INVENTION

It is therefore an object of the present invention to provide a method for increasing passenger seating comfort at typical load factors, relative to that achieved using current practice with seats of substantially equal dimensions.

It is another object of the instant invention to provide a method for increasing passenger seating comfort at typical load factors, relative to that achieved using current practice, in an airplane of fixed dimensions with a fixed number of seats.

It is a further object of the present invention to provide a method for maximizing the number of passenger seats in an airplane of fixed dimensions while maintaining the average comfort afforded passengers at typical load factors in an airplane of identical dimensions having fewer seats configured in accordance with current practice.

It is yet a further object of the instant invention to provide a method for decreasing airplane dimensions for substantially the same number of passengers while substantially maintaining the average comfort experienced by passengers at typical load factors in a more spacious airplane configured in accordance with current practice.

It is also an object of this invention to provide specific seating configurations that increase passenger seating comfort at typical load factors in an airplane with a fixed number of seats and aisles per row.

The process for achieving all of the foregoing objectives comprises (a) identifying the row configurations that can be reasonably accommodated by an airplane using a specified passenger seat type, (b) determining the level of comfort enjoyed by passengers seated in the different seating environments created by adjacent occupied seats, empty seats, sidewalls and aisles, (c) determining the frequency of occurrence of possible load factor increments, (d) calculating the average passenger comfort level (APCL) in each of the configurations under study using the comfort levels for each seating environment, weighted by the portion of passengers that would be seated in each environment at each load factor increment and the frequency of occurrence of that load factor increment, and (e) installing seats employing the configuration which provides the highest APCL.

In the processes of the present application which provide more comfort, passengers provided seats with dimensions substantially equal to those used with configurations determined by conventional methods may enjoy the additional comfort represented by the higher APCL relative to configurations identified by the current art.

According to the instant process for maximizing the number of passenger seats, the APCL of each configuration is stated in terms of the spatial equivalent of the additional comfort created by adjacent empty seats, sidewalls or aisles ("average useful additional area per passenger" or AUAAP) whereby seats with dimensions smaller than those used with configurations determined by conventional methods may be employed, effectively exchanging the increased comfort represented by the AUAAP advantage for the decreased comfort resulting from the smaller seat dimensions. Additional seats may thus be installed in the airplane floor area made available by the reductions in seat dimensions.

Airplane dimensions may be minimized in the present process by expressing the APCL of each configuration in terms of AUAAP whereby seats with dimensions smaller than those used with configurations determined by conventional methods are employed, thereby effectively exchanging the increased comfort represented by the AUAAP advantage for the decreased comfort resulting from the smaller seat dimensions. Airplane dimensions may thus be reduced to absorb the airplane floor area made available by the use of seats of smaller dimensions.

These and other advantages of the present invention will become more apparent from the following description of the preferred embodiments presented with reference to the accompanying drawings.

BRIEF DESCRIPTION OF THE DRAWINGS

FIG. 5 quantifies the comfort reported by passengers in various seating environments relative to that reported by a passenger seated between two other passengers.

BEST MODES OF CARRYING OUT THE INVENTION

Figure 1:
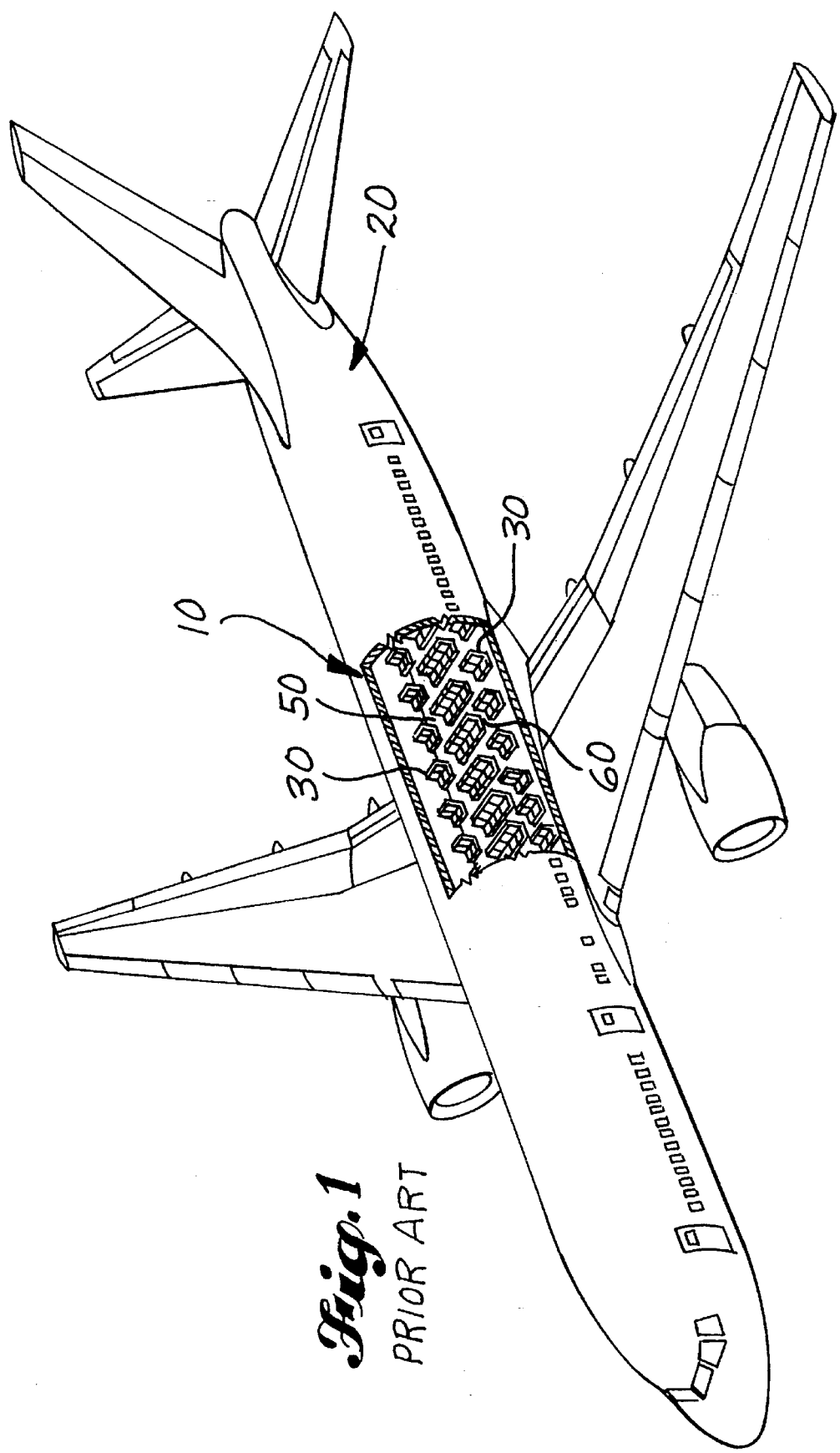
FIG. 1 is a schematic of a modern twin-aisle airplane cut away to illustrate a contemporary 2\4\2 seating arrangement.
Figure 2:
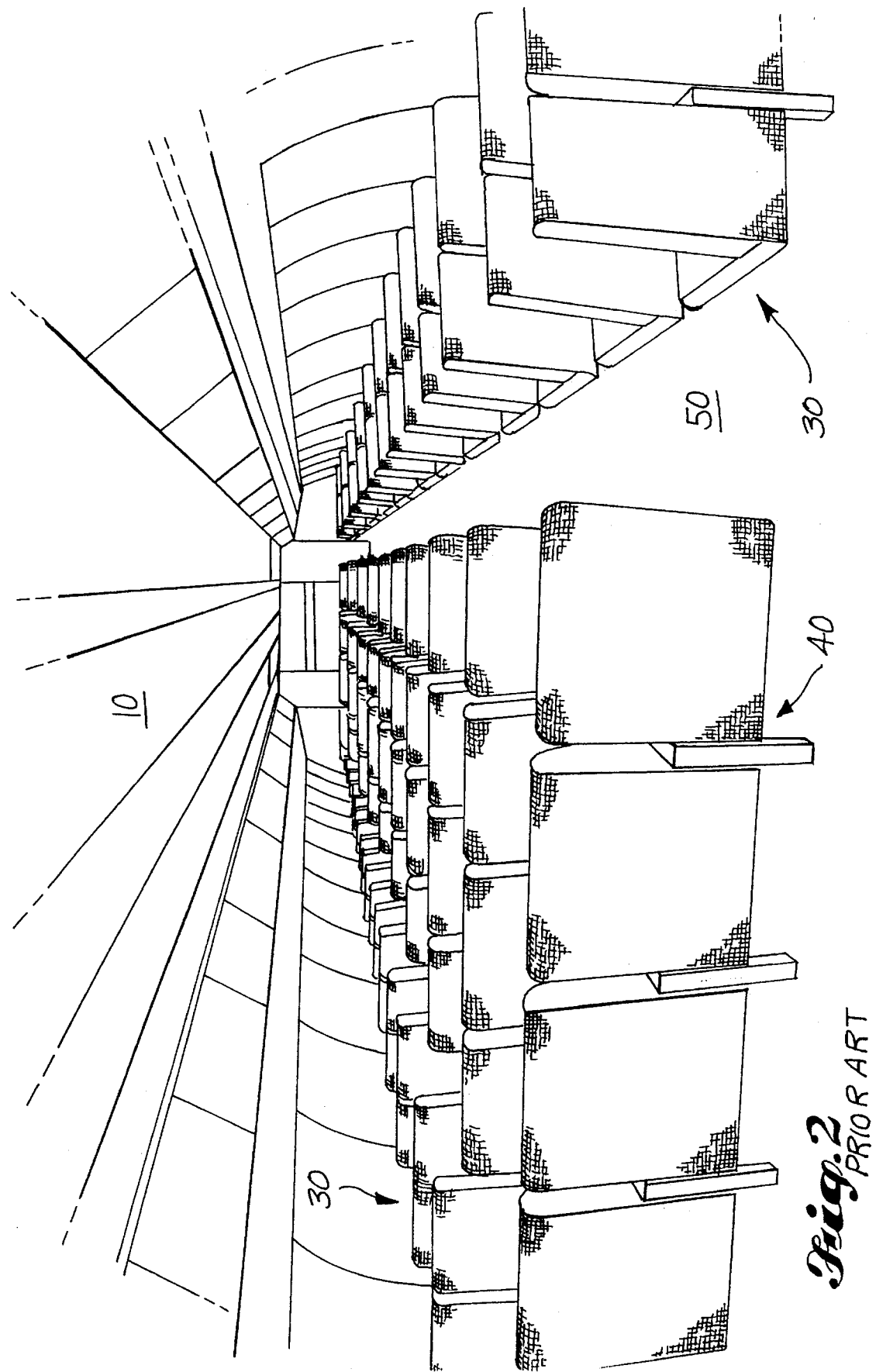
FIG. 2 shows the interior of the airplane of FIG. 1 looking towards the forward compartment.

The passenger compartment 10 of an airplane 20 is shown in schematic in FIGS. 1 and 2. In those pictorial views, there is a pair of seats 30 adjacent the airplane sidewalls and spaced from a plurality of center seats 40 by aisles 50 and 60. The seats 30, 40 are in the form of economy-class seats and each seat bottom and back have the same widths. This 2\4\2 arrangement is consistent with the industry practice described earlier. However, as will be better understood hereinafter, in contrast with the present invention, this seating configuration, and others which are obtainable using standard industry practices, do not provide the most comfort for passengers in airplanes of fixed dimensions, a fixed number of passenger seats, and seat type under the load factor conditions actually encountered in airline operations.

The following steps (a) through (e) correspond to those outlined in the summary of the invention as involved in achieving all of the objectives of the invention:

(a) Identifying potential row configurations:

The width of a passenger seat manufactured in accordance with industry standards for the selected level of service and accepted aisle widths for the selected level of service must be accounted for in determining all possible seat row configurations. For example, a standard economy-class seat is typically between seventeen (17) and eighteen (18) inches wide between a pair of two (2) inch wide armrests. Standard economy-class aisles are typically between seventeen (17) and twenty (20) inches wide. Therefore the process of identifying all possible row configurations for a given class of service is limited to identifying the possible candidates for a limited number of seats and aisles.

The regulatory requirements of the Federal Aviation Administration (FAA) and other airworthiness authorities stipulate that a passenger may not be seated more than two seats away from the nearest aisle. This results in a limitation on the number of seats in units used in specific locations within the passenger compartment. For example, only units with three or fewer seats may be used adjacent to a sidewall and units located between two aisles may have no more than six seats.

No six-seat units are known to be in service and, as a result, there is no reported passenger comfort data for any unique seating environments that may exist in them. Furthermore, when the process of the present invention is expanded to evaluate six-seat units, no merit is shown for their use. As a result, the present invention ignores the use of six-seat units.

In view of the above constraints, all possible row configurations for a given number of seats and aisles can be identified. The following analysis can be extrapolated to any number of aisles. However, for purposes of clarity, the discussion is limited to airplanes with up to three-aisles.

For single-aisle airplanes:

4 to 5 seats per row: 2\(s-2)

6 seats per row: 3\3

For two-aisle airplanes:

6 to 9 seats per row: 2\(s-4)\2

7 to 10 seats per row: 2\(s-5)\3, or 3\(s-5)\2

8 to 11 seats per row: 3\(s-6)\3

Where "s"=total number of seats per row

EXAMPLE

For eight abreast seating (s=8), two-aisle seating configurations consist of the following possible seating configurations: 2\4\2, 2\3\3, 3\3\2, and 3\2\3. As mentioned above, one such seating configuration, i.e., 2\4\2, is in use today in more than six hundred (600) commercial airplanes. None of the others, 2\3\3, 3\3\2 or 3\2\3, is known to be, or to have been, in use in more than a single row in any commercial airplane cabin. For example the 3\2\3 configuration has been used in a single row in a specially configured Boeing model 747 to accommodate the airplane's 3\4\3 configuration to the tapered nose section of the airplane. Because only a very small portion of the airplane's seats are configured in the 3\2\3 arrangement the benefits of the present invention can not be realized.

For three-aisle airplanes:

4 to 7 seats per half row: 2\(h-2)

5 to 8 seats per half row: 3\(h-3)

Where "h"=a half row, i.e., the number of seats from either sidewall of the airplane to the center or middle aisle.

Although combinations of all the half rows identified above are possible, no potential merit has been demonstrated for seating configurations with more asymmetry than necessary to accommodate an odd number of seats per row. More desirable configurations have equal numbers of seats per half row or, for odd numbers of seats per row, one more seat in one half row than in the other. When the total number of seats in a row is even, h=s/2. When the total number of seats is odd, h=(s/2)+0.5 for one half row whereas h=(s/2)−0.5 for the other half row.

EXAMPLE

For twelve abreast seating (s=12), six seats per half row (h=6), the possible seating configurations with potential merit consist of: 2\4\4\2 and 3\3\3\3.

Figure 3:
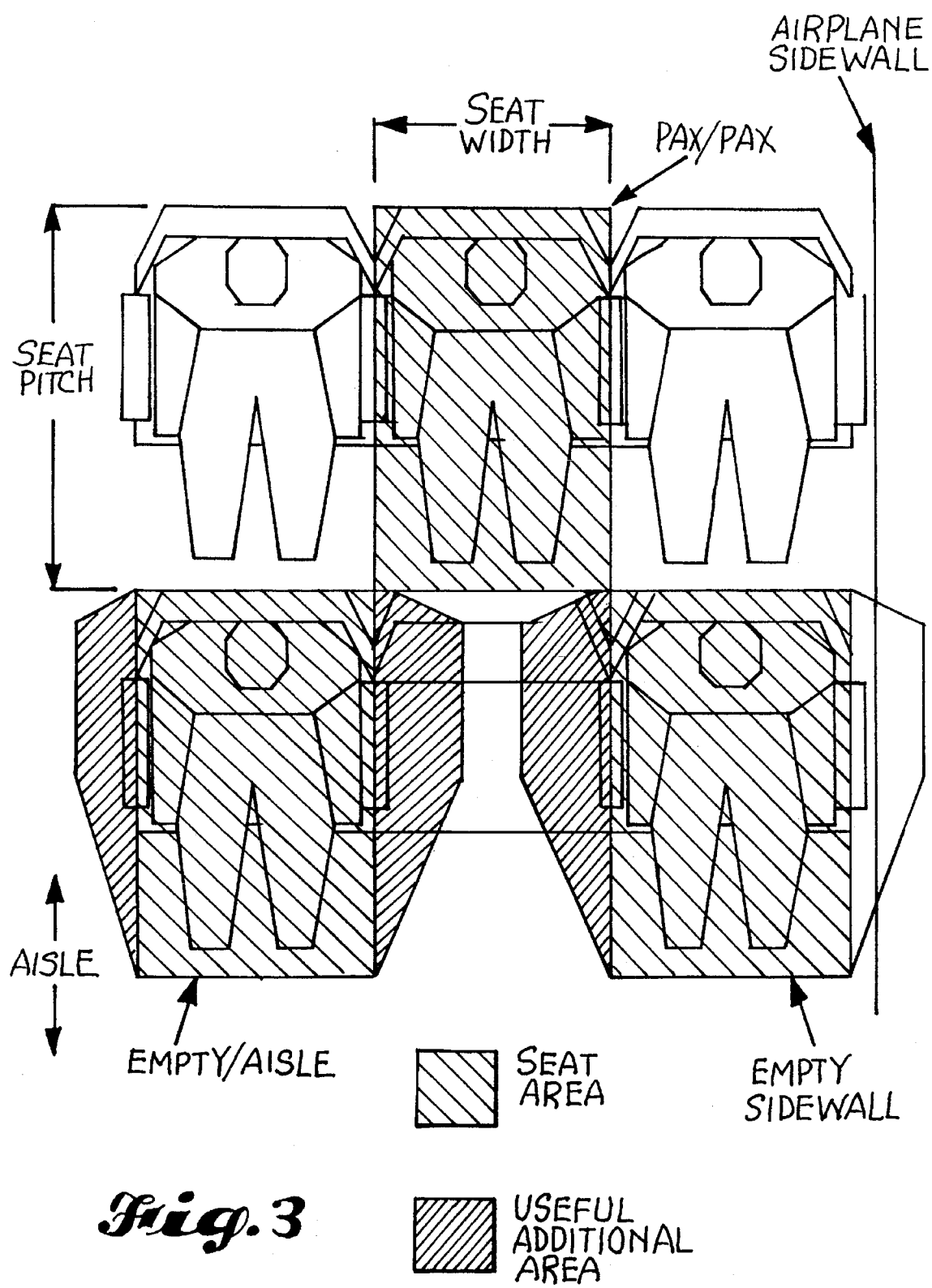
FIG. 3 qualitatively shows, viewed from overhead, the seat area, and useful additional area enjoyed by passengers in selected seating environments.

(b) Determining the level of comfort enjoyed by passengers in each seating environment:

Referring to FIG. 3, seat width is defined as the distance between the centers of the armrests on each side of a passenger seat.

Seat pitch is defined as the distance between the same feature on seats positioned in alignment in immediately adjacent rows. As an example, referring to FIG. 3, between the back edge of the upright seat back of a first seat and the back edge of the upright seat back of a second seat positioned in alignment with the first seat in an immediately adjacent row.

Seat area is defined to equal seat width times seat pitch.

While some objectives of the present invention can be achieved employing abstract measures of passenger comfort, measures which are readily related to the physical dimensions of seating have been found to be most useful because they relate directly to the parameters that industry managers are accustomed to using to influence passenger comfort, i.e., seat pitch and seat width. A particularly useful spatial measure of comfort is the total amount of useful additional area enjoyed by passengers in a horizontal plane. This horizontal plane is best visualized at the shoulder level of seated passengers because anthropometric data show that passengers are typically widest at the shoulder and, as a result, interference between adjacent passengers, sidewalls and objects in the aisle most often occurs at seated shoulder level. This total useful area has been broken down into two components illustrated in FIG. 3: seat area and the useful additional area (UAA) made available to passengers by adjacent empty seats, aisles and sidewalls. The specific shape of UAA has been arbitrarily shown in the darker shaded portion of FIG. 3. Seat area is shown in the lighter shaded area of that drawing.

Not all available area is useful in improving passenger comfort. As an example, although the entire seat area of an empty seat may be available to the passengers seated on either side, passenger surveys reveal that the comfort of passengers seated beside empty seats is improved by a smaller amount than would be expected if the passengers' seat area had been increased by fifty (50) percent (each adjacent passengers' share of the empty seat between them).

Passengers seated beside sidewalls report average comfort levels higher than would be expected if their seat area had simply been increased by the area available between their seat and the sidewall. In this case the privacy and physical support afforded by the sidewall is interpreted as providing the comfort equivalent of more useful additional area.

Because not all available area is useful in improving comfort and because sidewalls provide more comfort than can be accounted for by the area available between the passenger's seat and the sidewall, it is impractical to measure UAA directly. As a result, UAA is defined to equal the amount of additional seat area that would produce a comparable increase in passenger comfort. The UAA enjoyed by passengers seated in the various seating environments created by adjacent occupied seats, empty seats, sidewalls and aisles can be derived using the following procedure:

Passengers report different levels of comfort depending upon whether they are seated (e.g.) between an empty seat and a sidewall (Empty/Sidewall), between a passenger and an aisle (Pax/Aisle), or between two other passengers (Pax/Pax). Typical results for economy-class passengers are summarized in FIG. 4.

Figure 4:
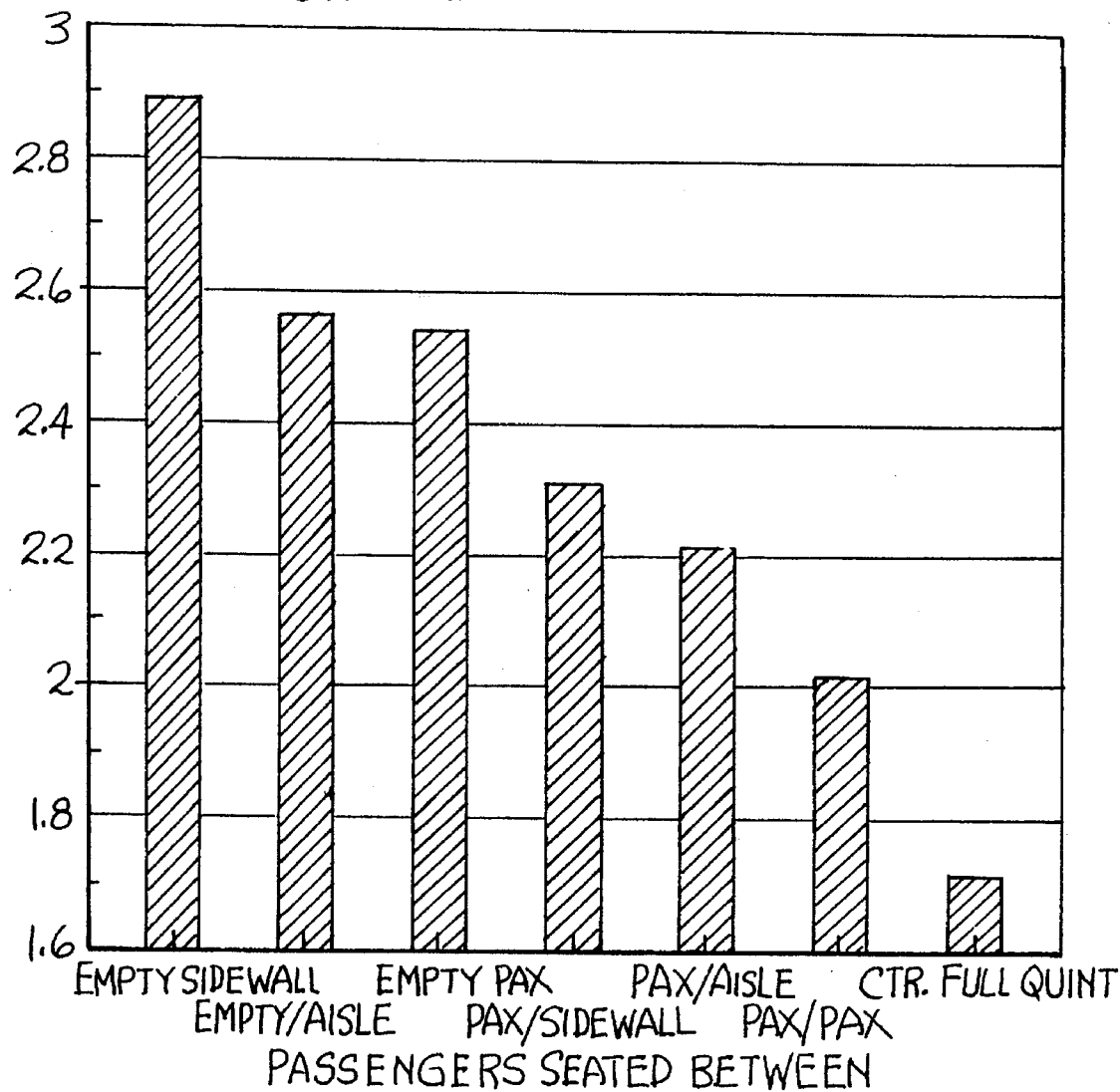
FIG. 4 quantifies the average comfort reported by passengers in various seating environments.

Survey results are preferably taken from passengers in airplanes capable of producing data for all seating environments occurring in economy-class service, including the center seat in a full 5-seat unit (Ctr., full quint). A McDonnell Douglas model DC-10, in which all such seating environments can be studied, has been found to be a good survey vehicle. Surveys conducted aboard other airplane types have consistently revealed the same relationships among the seating environments present. In FIG. 4 a constant has been subtracted from each comfort score to obscure data that are proprietary to the airlines surveyed. However this does not influence the results because, as will be shown, these data are used to establish comfort relative to a selected reference rather than absolute comfort.

It should be noted that there are no data for the seating environments of a sidewall on one side and an aisle on the other, and of an aisle on both sides, that would only be encountered with single-seat units. Single seats are only desirable under limited conditions in which current practice provides optimal comfort results, as a result the current invention does not address itself to the use of single seats.

It should also be noted that there are no data for seating environments created by features other than occupied seats, empty seats, sidewalls and aisles. Such other features, e.g., galley walls, may create unusual environments. However because so few passenger seats are positioned adjacent such features, the sample sizes present in available passenger survey data are not adequate to establish a statistically reliable estimate of the average comfort level experienced by passengers in such unusual environments. As a further result of such a small portion of total passengers being seated in such unusual environments, the impact of such environments on the average comfort of all passengers in an airplane is insignificant. For this reason, the present invention considers that adequate precision is achieved by considering the average comfort of passengers in such unusual seating environments as equal to the comfort of passengers seated in the most analogous usual environment, e.g., the average comfort of passengers seated between an occupied seat and a galley wall can be considered as being equal to the average comfort of passengers seated between an occupied seat and a sidewall. If any additional seating environment becomes sufficiently common that a reliable measure of average passenger comfort in such an environment can be readily obtained, the methods of the present invention are easily extended to include the additional environment.

All of the passengers surveyed in the study whose results are portrayed in FIG. 4 were seated in seats of substantially equal dimensions. The differences in passenger comfort quantified in FIG. 4 can therefore be attributed to the UAA of the various seating environments.

As can be seen in FIG. 3, the total area available to a passenger seated between two other passengers (Pax/Pax) is limited by the presence of the adjacent passengers solely to the seat area. As a result, passengers seated between two other passengers can be considered as having no useful additional area, and therefore, the average comfort rating for passengers seated between two other passengers (Pax/Pax) illustrated in FIG. 4 can be equated to the comfort resulting from the seat area of the airplane under study.

The portion of the average comfort rating resulting from the UAA enjoyed by passengers in other seating environments can, therefore, be calculated by subtracting the comfort rating illustrated in FIG. 4 of passengers seated between two other passengers (Pax/Pax) from the comfort rating of passengers in other seating environments. As an example, the average comfort reported by Pax/Pax passengers of 2.01 subtracted from the 2.31 average comfort reported by Pax/Sidewall passengers equals 0.30. These average comfort ratings, representative of the comfort resulting from the UAA of the various seating environments, are quantified in FIG. 5.

Passengers seated in the center seat of a full five-seat unit are shown as reporting average comfort levels indicative of negative UAA. This is interpreted as the spatial equivalent of the discomfort resulting from being seated in this undesirable environment. This discomfort is generally regarded as the result of being seated two seats away from an aisle.

Passenger comfort surveys have been conducted aboard airplane types such as the McDonnell Douglas model MD-80 and Fokker model F28 in which two seat units are positioned against one sidewall and three seat units are positioned against the opposite sidewall. In these surveys the average comfort reported by passengers seated (in the three-seat units) between a sidewall and an occupied seat two seats away from an aisle is not significantly different from that reported by passengers seated (in the two-seat units) between a sidewall and an occupied seat only one seat away from an aisle. As a result, unlike passengers seated between two other passengers in the center of a five-seat unit, the comfort of passengers seated between a sidewall and an occupied seat is considered not to be influenced by the number of seats between the passenger and the nearest aisle.

This finding is in direct conflict with the assumption that guides the current art, i.e., passenger comfort is maximized by minimizing the number of seats between any passenger and the nearest aisle. However, diligent analysis of the available data, which is adequate to establish these relationships in accordance with standard practices, shows that the number of seats between a passenger in a sidewall seat and an aisle does not have a significant effect on the comfort of passengers in sidewall seats when adjacent seats are occupied.

Figure 6:
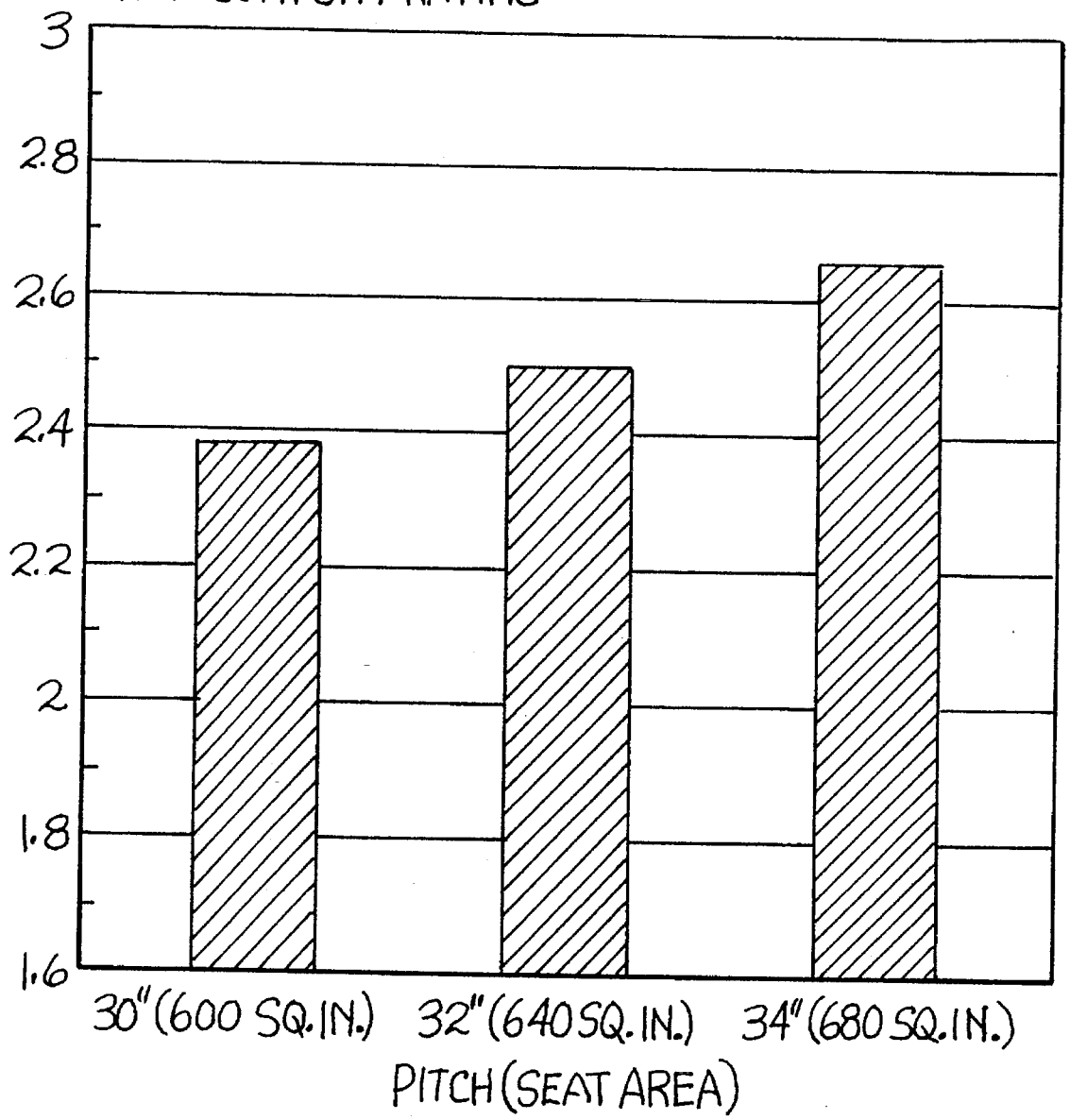
FIG. 6 quantifies the average comfort of passengers in various seat pitches.
Figure 6:
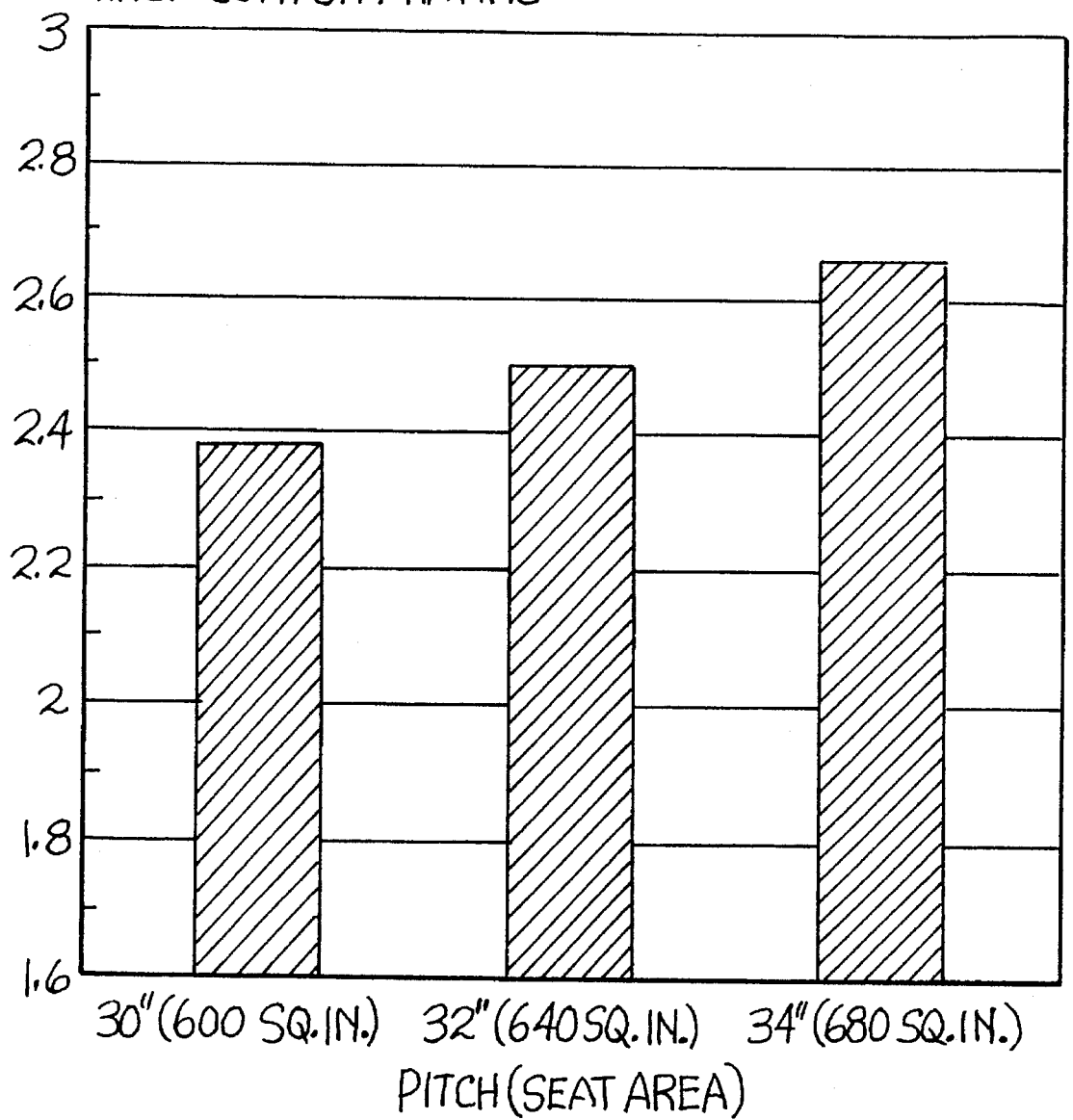

Many in-flight surveys asking the same question about passenger comfort, using the same scale, have been conducted aboard airplanes with economy-class seats installed at a variety of different seat pitches in different rows. The results of one such survey of economy class passengers are shown in FIG. 6. A constant has been subtracted from each comfort score in FIG. 6 to obscure data that are proprietary to the airlines surveyed.

It is generally accepted that increases in seat width, as well as increases in seat pitch, improve passenger comfort. Furthermore, it is known that, within practical limits, increases in seat pitch and seat width that result in comparable increases in seat area result in comparable improvements in passenger comfort. As a result, square inches of seat area are a useful measure of the passenger comfort resulting from the physical dimensions of passenger seats.

The survey data presented in FIG. 6 show that a four (4) inch increase in seat pitch results in a 0.28 point increase in the reported average comfort level in the study airplane. The study airplane had passenger seats that were twenty (20) inches wide (eighteen (18) inch wide cushions between two (2) inch wide armrests). As a result, a four (4) inch increase in pitch resulted in an eighty (4×20=80) square inch increase in seat area. As a further result, an eighty (80) square inch increase in seat area results in a 0.28 point increase in reported average comfort level or a one (1) square inch increase in seat area results in a 0.0035 point increase in reported average comfort level (0.28/80=0.0035). This relationship, or a similarly calculated one, can be used in the present invention to convert the values for reported comfort resulting from UAA shown in FIG. 5 into square inch (or similar) values of UAA. As an example, as indicated in FIG. 5, passengers seated between another passenger and a sidewall (Pax/Sidewall) report comfort 0.30 points higher than passengers seated between two other passengers (Pax/Pax). That difference divided by the 0.0035 points per square inch relationship established above results in a UAA value of 85.7 square inches for passengers seated between another passenger and a sidewall.

The foregoing calculation of the UAA enjoyed by passengers in any particular seating environment can be generalized into the following formula:

$$UAA_X = B_X - C \div \frac{D-E}{F-G}$$

Where:

$UAA_X$=useful additional area in seating environment X
and from a survey of passengers with identical seat area:

$B_X$=average comfort level of passengers in seating environment X

C=average comfort level of passengers seated between two other passengers and from a survey of passengers with different amounts of seat area (seat width x seat pitch):

D=average comfort level of passengers with most seat area

E=average comfort level of passengers with least seat area

F=seat area of passengers with most seat area

G=seat area of passengers with least seat area

Figure 7:
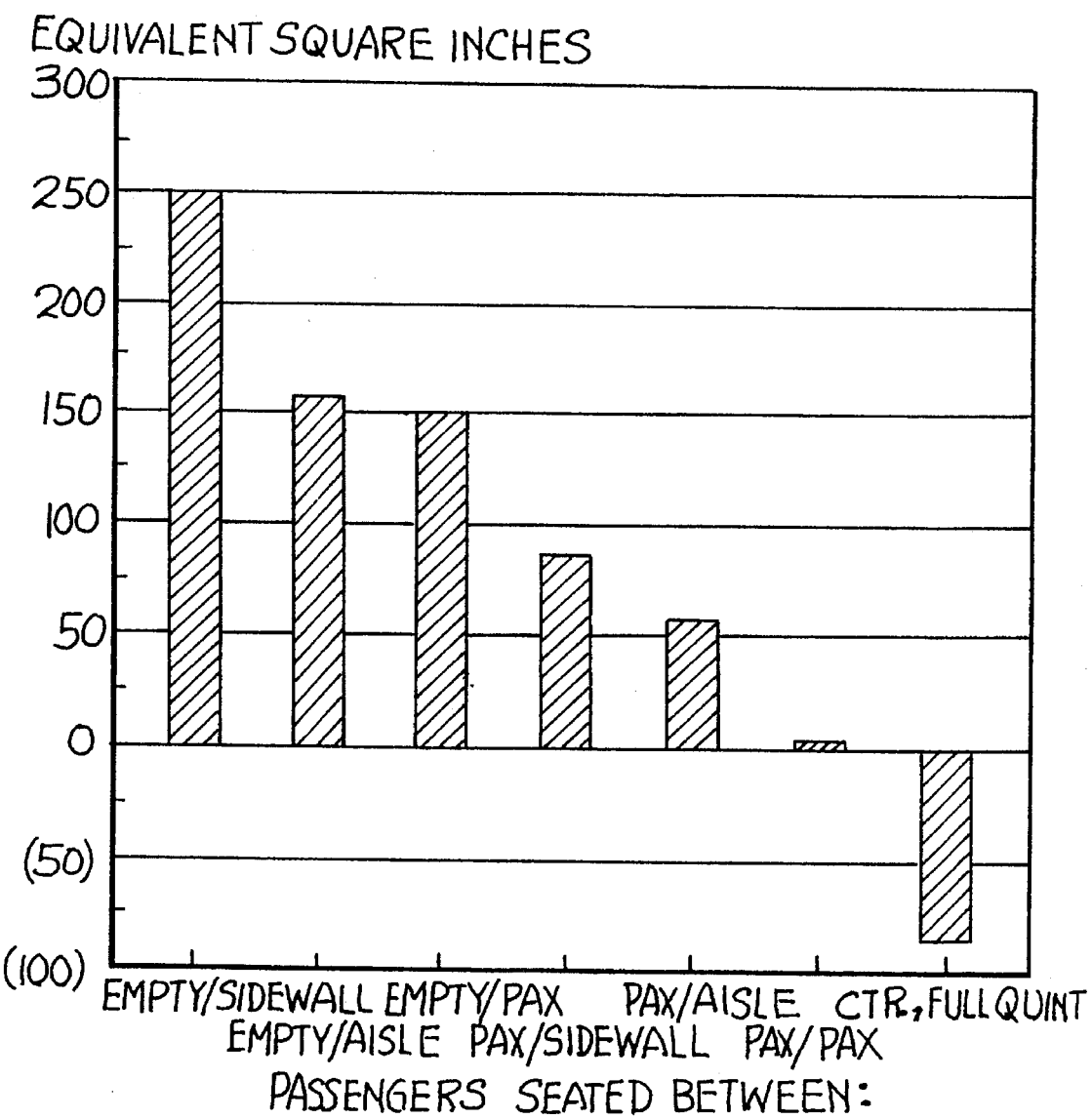
FIG. 7 quantitatively portrays the useful additional area enjoyed by passengers in different seating environments occurring in airline service.

The UAA enjoyed by passengers in the various seating environments, calculated using the above formula, is quantified in equivalent square inches in FIG. 7.

(c) Determining the frequency of occurrence of load factor increments:

Because the demand for travel on individual routes vades considerably, airlines typically operate airplanes which are sufficiently large to provide extra capacity to accommodate above average demand. As a result, an average of only sixty (60) to seventy (70) percent of airplane seats are typically occupied in airline service, i.e., thirty (30) to forty (40) percent remain empty.

Figure 8:
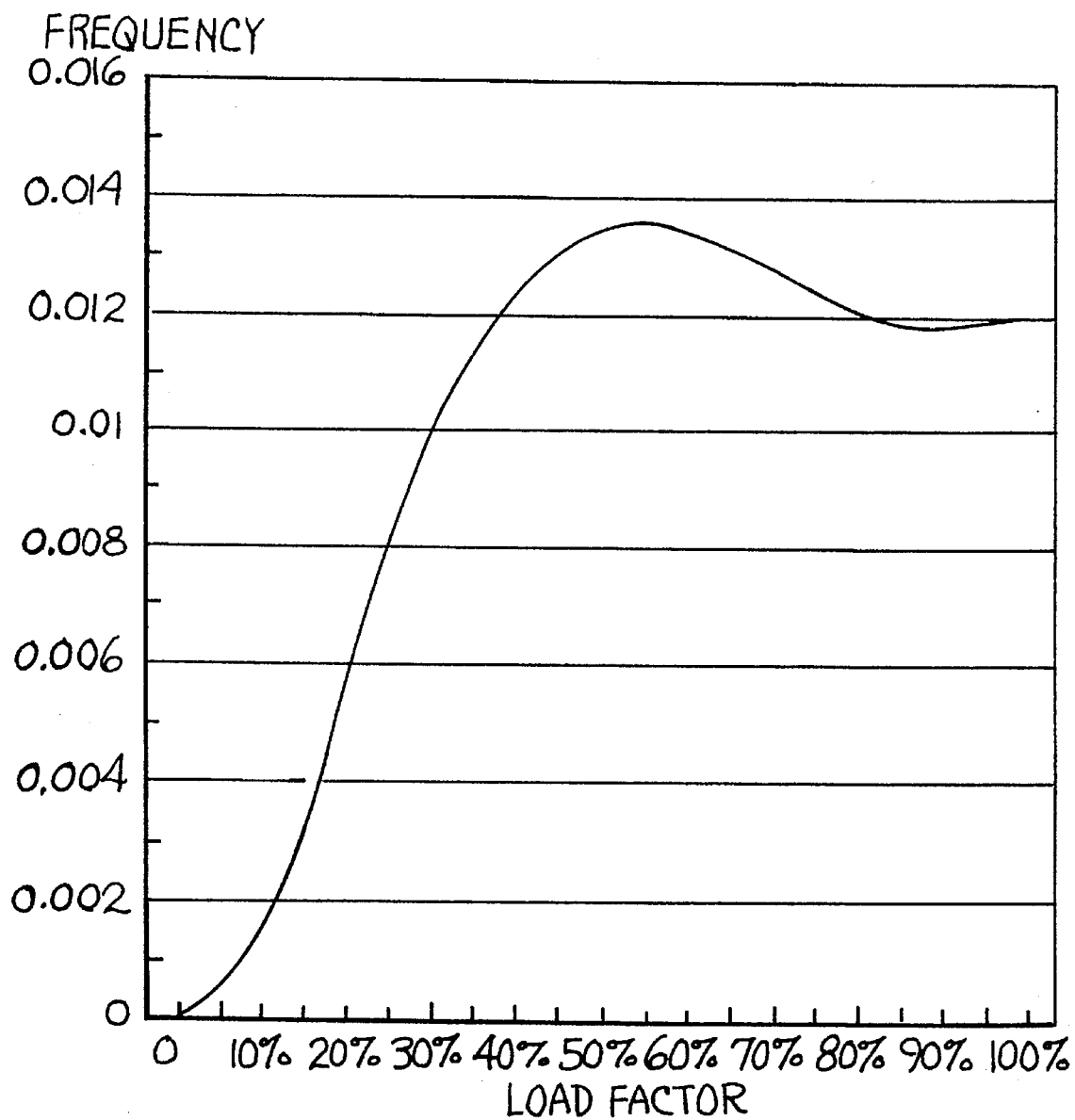
FIG. 8 shows a typical distribution of actual airline load factors.

Reflecting the variation in demand, load factors vary considerably around the average. A typical distribution of the frequency of occurrence of individual load factors is shown in FIG. 8. Such a distribution is easily constructed based on airline boarding records.

(d) Calculating average passenger comfort level:

An optimum order for assigning seats has been devised by most airlines based upon their perception of what seating environments are most comfortable. Typically, sidewall seats are filled first (phase A, FIGS. 9A and 10A); aisle seats next to unoccupied seats, second (phase B, FIGS. 9B, 10B and 10C); remaining aisle seats, third (phase C, FIGS. 9C, 9D and 10D); seats between an empty seat and an occupied seat, fourth (phase D, FIG. 9E), and finally, any remaining seats (phase E, FIGS. 9F, 10E and 10F). Having a measure for the UAA of each seating environment and knowing what seats are occupied at what load factors, the average amount of UAA per passenger, UAAP, can be calculated for all passengers at each load factor using a standard arithmetic procedure (i.e. by summing the UAA of each passenger on board at the selected load factor and dividing by the number of passengers).

Figure 10C:
FIG. 10C symbolically depicts a 3\2\3 seating configuration when five seats per row are occupied.
Figure 11:
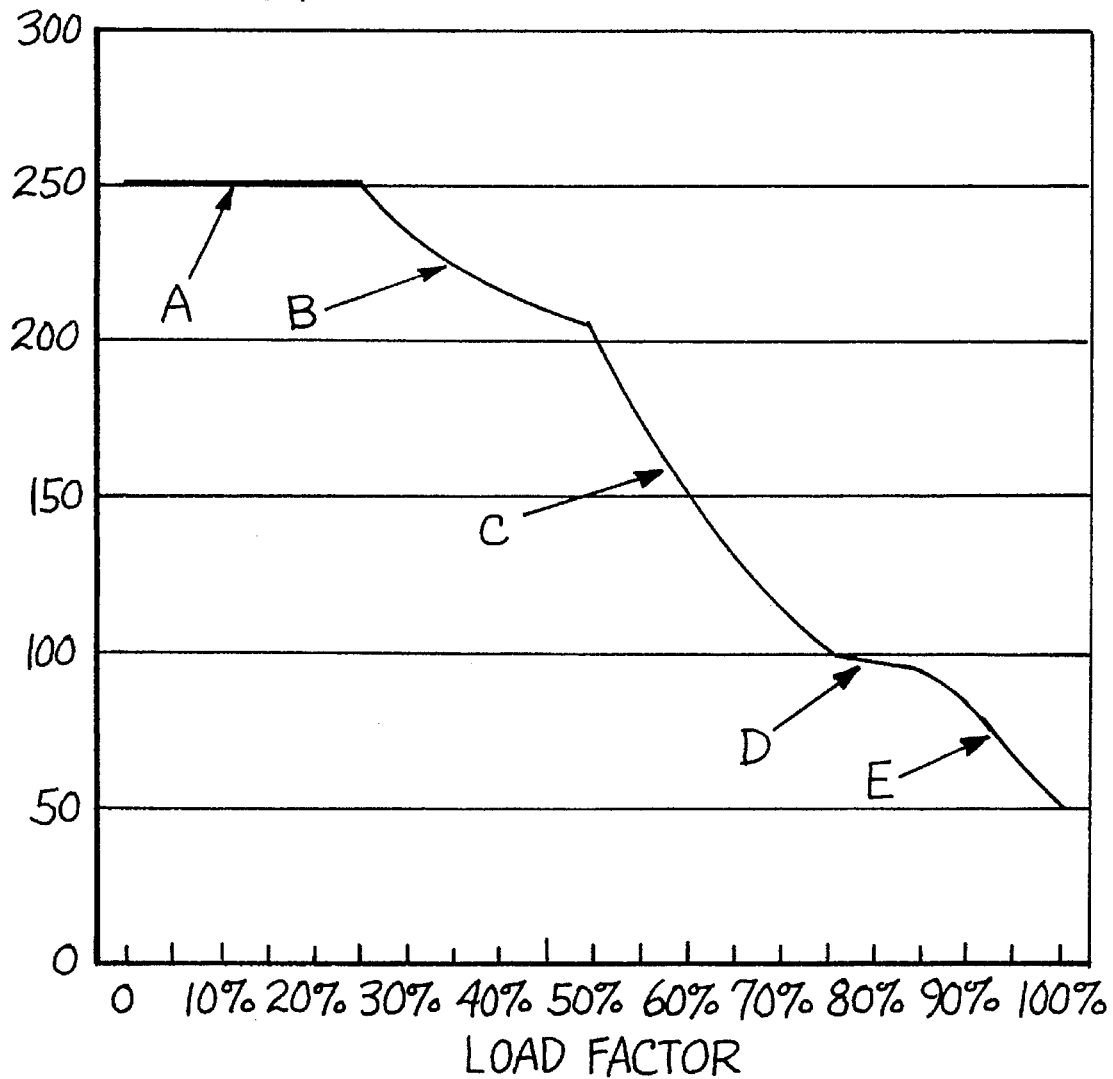
FIG. 11 illustrates useful additional area per passenger at each load factor in the 2\4\2 seating configuration of FIGS. 9 using the values of useful additional area shown in FIG. 7.
Figure 12:
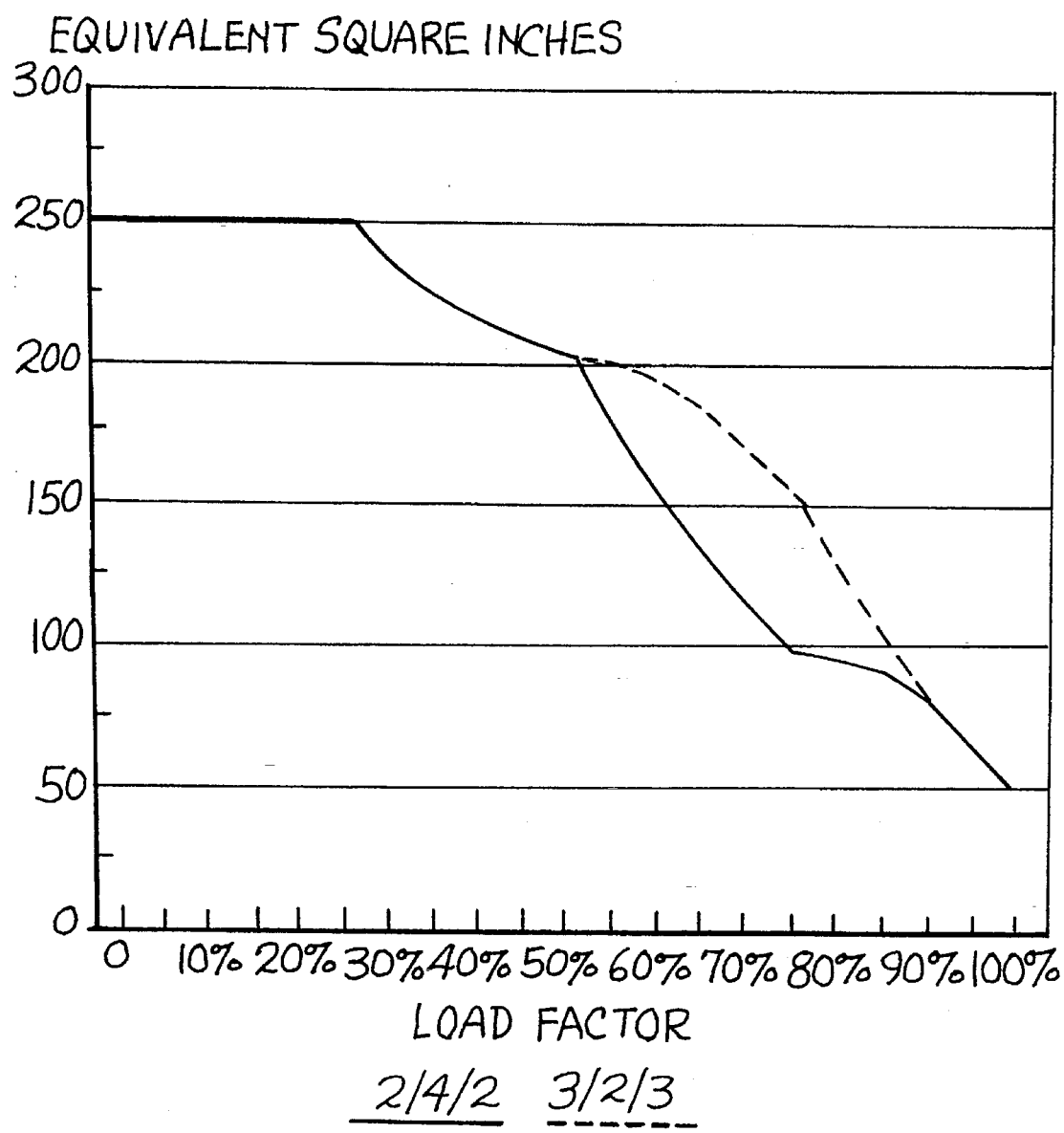
FIG. 12 illustrates useful additional area per passenger at each load factor in the 2\4\2 seating configuration illustrated in FIGS. 9 and the 3\2\3 seating configuration illustrated in FIGS. 10 using the values of useful additional area shown in FIG. 7.

FIG. 11 illustrates the UAAP available at each load factor in the conventional 2\4\2 seating configuration described earlier. The seat assignment phases A through E described previously and illustrated in FIGS. 9A through 9F are indicated by the letters A through E in FIG. 11. As is clearly shown, UAAP declines as load factor increases. However, applicant has discovered that UAAP declines at different rates for different seating configurations. This is illustrated in FIG. 12 using 2\4\2, and 3\2\3 seating configurations and is in largest part a result of the fact that all passengers can be seated beside an empty seat up to a 62.5% load factor in a 3\2\3 configuration, but only to a 50% load factor in a 2\4\2 configuration (see FIGS. 10C and 9B). Indeed, in the 3\2\3 configuration more passengers are seated beside an empty seat at all load factors between 50% and 87.5%. Thus as is seen in FIG. 12, UAAP declines at different rates for different seating configurations as load factor increases.

The average amount of UAAP enjoyed by passengers in a given configuration under varying load factor conditions, AUAAP, is equal to the UAAP at each possible load factor weighted by the frequency of occurrence of that load factor and the number of passengers on board at that load factor. AUAAP can be stated algebraically as the integrated product from zero (0) to one hundred (100) percent of the frequency of occurrence of each load factor, the load factor itself and the UAAP at each load factor, all divided by the average load factor:

$$AUAAP = \frac{1}{M} \left[ \int_0^{100\%} P(f)\,(f)\,UAAP_f\,df \right]$$

Where:

AUAAP=average useful additional area per passenger

M=average load factor f=load factor

P(f)=frequency of occurrence of load factor f $UAAP_f$=useful additional area per passenger at load factor f By replacing the terms (f) $UAAP_f$ in the foregoing equation by an algebraic calculation of $UAAP_f$ which embodies the conventional seat assignment priorities described earlier and the values for the UAA for each seating environment which were developed earlier, a generalized equation for the AUAAP in configurations composed of any combination of 2-, 3-, 4-, and 5-seat units compliant with FAA regulations can be stated. In the following formula, the integration limits are the load factors at which the seat assignment process completes the assignment of seats in a particular category (e.g., seats adjacent sidewalls for A, aisle seats adjacent empty seats for B, and so on). Within each integration interval the algebra describes the product of the frequency of occurrence of the load factor and the sum of the products of the portion of available seats occupied by passengers in each seating environment and the UAA of the corresponding seating environment.

$$AUAAP = \frac{1}{M} \left[ \int_0^A P(f)\,(f)\,(WE)\,df + \int_A^B P(f)\,[(A)\,(WE) + \right.$$

$$(f-A)\,AE]\,df + \int_B^C P(f)\,(A)\,(WE) + (B-A)AE +$$

$$(f-B)\,(2AP - AE)]\,df + \int_C^D P(f)\,[A*WE + (B-A)AE +$$

$$(C-B)\,(2AP - AE) + (f-C)\,(AP + WP - WE)]\,df +$$

$$\int_D^E P(f)\,[A*WE + (B-A)AE + (C-B)\,(2AP - AE) +$$

$$(D-C)\,(AP + WP - WE) + (f-D)\,(AP + PE - AE)]\,df +$$

-continued $$\int_E^G P(f) [A*WE + (B-A)AE + (C-B)(2AP-AE) +$$
$$(D-C)(AP+WP-WE) + (E-D)(AP+PE-AE) +$$
$$(f-E)(2PP+AP-PE-AE)] \, df + \int_G^H P(f) [A*WE +$$
$$(B-A)AE + (C-B)(2AP-AE) + (D-C)(AP +$$
$$WP-WE) + (E-D)(AP+PE-AE) + (G-E)(2PP +$$
$$AP-PE-AE) + (f-G)(PP+2AP-2AE)] df +$$
$$\int_H^K P(f) [A*WE + (B-A)AE + (C-B)(2AP-AE) +$$
$$(D-C)(AP+WP-WE) + (E-D)(AP+PE-AE) +$$
$$(G-E)(2PP+AP-PE-AE) + (H-G)(PP+2AP -$$
$$2AE) + (f-H)(AP+PP+WP-AE-WE)] \, df +$$
$$\int_K^1 P(f) [A*WE + (B-A)AE + (C-B)(2AP-AE) +$$
$$(D-C)(AP+WP-WE) + (E-D)(AP+PE-AE) +$$
$$(G-E)(2PP+AP-PE-AE) + (H-G)(PP+2AP -$$
$$2AE) + (K-H)(AP+PP+WP-AE-WE) +$$
$$(f-K)(CQ+2PP-2PE)] \, df \Big]$$

Where:
AUAAP=average useful additional area per passenger
M=average load factor
f=specific load factor
P(f)=frequency of occurrence of load factor f
WE=UAA enjoyed by passengers seated between a sidewall and an empty seat
AE=UAA enjoyed by passengers seated between an aisle and an empty seat
WP=UAA enjoyed by passengers seated between a sidewall and another passenger
AP=UAA enjoyed by passengers seated between an aisle and another passenger
PE=UAA enjoyed by passengers seated between an empty seat and another passenger
PP=UAA enjoyed by passengers seated between two other passengers
CQ=UAA enjoyed by passengers seated in the center seat of a full five-seat unit
WZ=the total number of outboard (positioned against a sidewall) two-seat units per row (or airplane*)
WD=the total number of outboard (positioned against a sidewall) three-seat units per row (or airplane*)
CZ=the total number of inboard (positioned between two aisles) two-seat units per row (or airplane*)
CD=the total number of inboard (positioned between two aisles) three-seat units per row (or airplane*)
CV=the total number of inboard (positioned between two aisles) four-seat units per row (or airplane*)
CF=the total number of inboard (positioned between two aisles) five-seat units per row (or airplane*)
s=the total number of seats per row (or airplane*)
A=(WZ+WD)/s
B=A+[CZ+2(CD+CV+CF)+WD]/s
C=B+CZ/s
D=C+WZ/s
E=D+(CV+2CF)/s
G=E+CV/s
H=G+CD/s
K=H+WD/s

* while calculating the AUAAP for a typical row generally provides adequate precision, because the presence of lavatories, galleys or similar installations often results in some incomplete rows, it may be considered desirable to specify the configuration in terms of every seat unit in the cabin. The preceding formula is suitable for either approach.

Other mathematical approaches can be taken to describe the same phenomenon. As an example, it may prove desirable to conduct the integration as summation of incremental load factor steps if the available load factor data is in such a form, or for ease of solution by computer. Such alternative approaches may also employ the same logical elements in a different sequence, e.g., first calculating the fraction of total passengers who are seated in each environment in a given configuration under given load factor conditions and subsequently using those fractions as weighting coefficients in the calculation of a weighted average of the UAA enjoyed by passengers in all seating environments. Such alternative approaches would use seat assignment logic and load factor weighting like those fundamental to the preceding formula to calculate the fraction of passengers in each seating environment and standard arithmetic techniques for calculating AUAAP.

(e) Installing seats:

The last step comprises installing seats using the candidate configuration with the highest value of AUAAP, whereby passenger comfort in seats of any given dimensions may be maximized.

The present invention also contemplates a method for increasing passenger comfort relative to that achieved with the current art in an airplane of fixed dimensions and substantially equal number and type of seats. As is obvious, improving the comfort enjoyed by passengers is highly desirable. Greater comfort has been shown to attract passengers willing to pay higher fares as well as a greater share of passengers in a competitive environment.

Installing seats of the same dimensions as those employed with the current art using the configuration with the highest value of AUAAP maximizes passenger comfort while maintaining a substantially equal number of passenger seats in an airplane of fixed dimensions.

Figure 13:
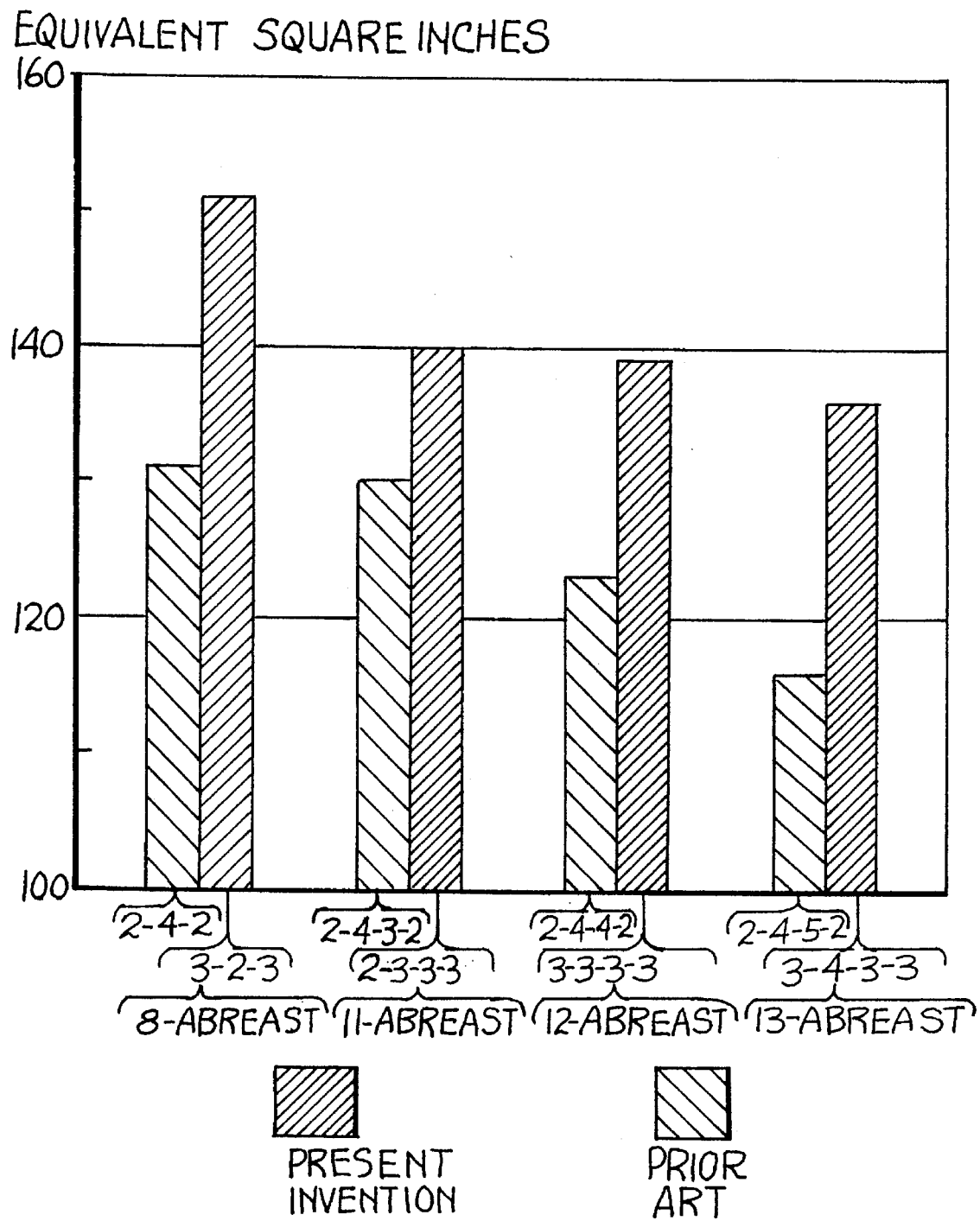
FIG. 13 plots the average useful additional area per passenger, AUAAP, for various configurations calculated using the values of useful additional area shown in FIG. 7, and the distribution of load factors shown in FIG. 8.

As an example, if seats of identical width are employed at identical pitch, the possible alternative configurations are reduced to those with the same number of seats and aisles per row. AUAAP for possible alternatives of 8-abreast two-aisle, and 11-, 12-, and 13-abreast three-aisle configurations are displayed in FIG. 13. Configurations obtainable with the present invention provide up to twenty (20) square inches more AUAAP than those obtainable with the current art. This is a comfort advantage substantially equal to that resulting from a one (1) inch increase in seat pitch (20in. seat width×1 in. seat pitch=20 square inches).

It is also significant to note that the prior art teaches away from the selection of the seating configurations suggested by the present invention. In each of the instant configurations a number of passengers will be seated more than one seat away from the nearest aisle. Such configurations are not typically chosen because conventional wisdom deems them less than ideal as mentioned above.

The present invention also comprises a method of increasing the number of passenger seats while maintaining substantially the same comfort levels offered within the same airplane carrying fewer passengers when configured in accordance with current practice. In this discussion, it is assumed that the airplane is of fixed dimensions with the same floor space available for positioning the same type of passenger seats as in the previous discussion. As is obvious, adding revenue producing passenger seats to the airplane is highly desirable. Each additional seat potentially represents as much as several hundreds of thousands of dollars in sales per year to a commercial airline.

When installing seats in an airplane using a configuration which provides more AUAAP than a configuration identified using current practice, the seat area can be reduced by an amount equal to the AUAAP advantage. Thus, the greater comfort resulting from the greater AUAAP may be exchanged for the lesser comfort resulting from the smaller seat area. The reduction in seat area makes area within the airplane available for additional seats.

Figure 14:
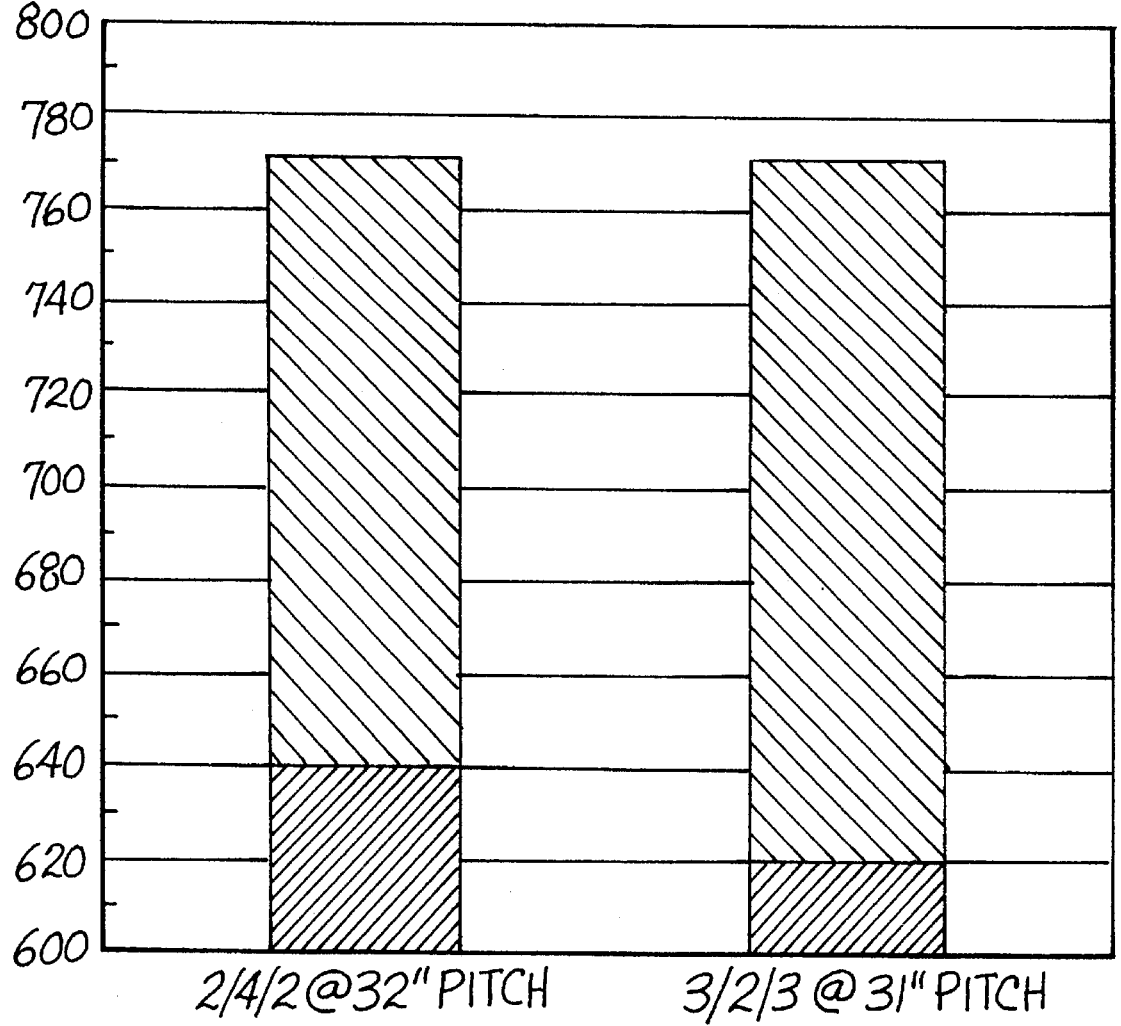
FIG. 14 plots the total useful area per passenger, the sum of the seat area and the AUAAP, for a 2\4\2 configuration at 32 inches of pitch and a 3\2\3 configuration at 31 inches of pitch.

As an example, under typical load factor conditions, 3\2\3 configurations provide approximately 20 square inches more AUAAP than 2\4\2 configurations. Reducing the pitch of standard twenty (20) inch wide seats by one (1) inch will result in an offsetting twenty (20) square inch reduction in seat area (20×1=20). As a result, an airplane configured according to current practice containing 31 rows of 20 inch wide seats in a 2\4\2 arrangement at 32 inches of pitch can be reconfigured in a 3\2\3 arrangement at 31 inches of pitch providing equal amounts of total useful area per passenger (the sum of seat area and AUAAP), and therefore equivalent comfort. However, the one (1) inch of pitch gained from each of the 31 rows makes 31 inches of pitch available for one additional row of eight (8) revenue producing seats. The total useful area per passenger for a 2\4\2 configuration at 32 inches of pitch and a 3\2\3 configuration at 31 inches of pitch is quantified in FIG. 14 using the UAA data portrayed in FIG. 7 and the load factor distribution illustrated in FIG. 8. Thus, passengers may experience substantially the same comfort in either configuration.

The present invention further comprises a method of decreasing airplane dimensions for substantially the same number of passengers at substantially the same original comfort levels with the same seat type. In this discussion it is assumed that the airplane passenger capacity and desired comfort level are essentially fixed while, as is the case early in the airplane design process, the dimensions of the airplane can be changed.

Reducing the dimensions of an airplane reduces the structural weight and aerodynamic drag of the airplane resulting in lower operating costs. Reducing operating costs while holding passenger capacity and comfort levels essentially constant is obviously desirable because reducing costs, without changing the capacity and comfort qualities that determine revenue, results in higher operating profit for the airline.

As shown above, when installing seats in an airplane using a configuration which provides more AUAAP than a configuration identified using current practice, the seat area can be reduced by an amount equal to the AUAAP advantage. In this manner the greater comfort resulting from the greater AUAAP may be exchanged for the lesser comfort resulting from the smaller seat area. The reduction in seat area accomplished through the use of narrower seats and/or shorter seat pitch makes it possible to make the airplane itself narrower and/or shorter resulting in less structural weight and aerodynamic drag.

Figure 15:
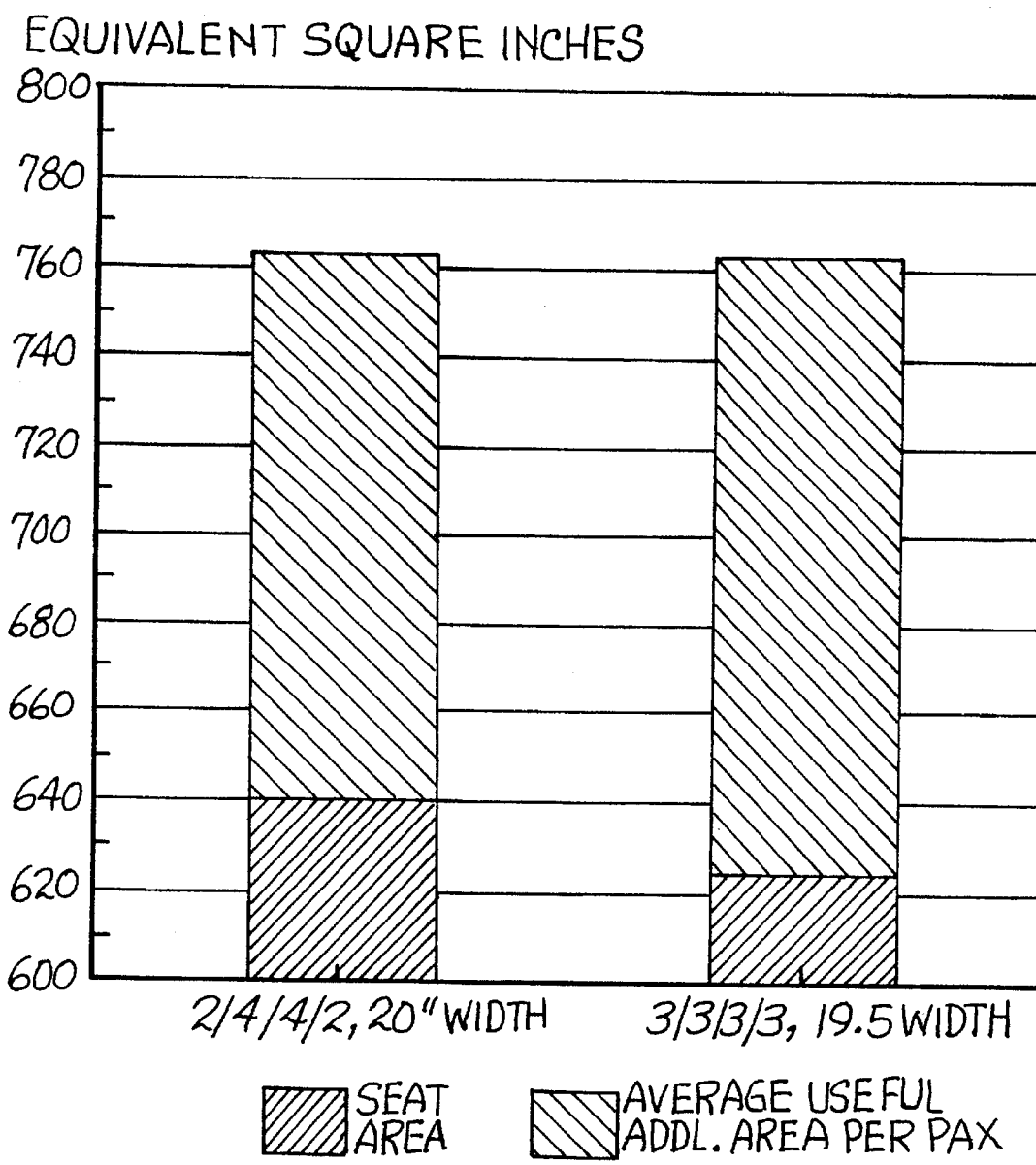
FIG. 15 plots the total useful area per passenger for a 2\4\4\2 configuration with 20 inch wide seats and a 3\3\3\3 configuration with 19.5 inch wide seats.
Figure 16:
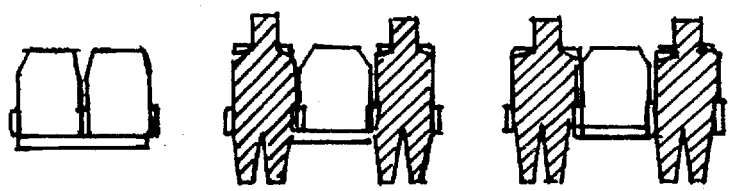
Figure 17:
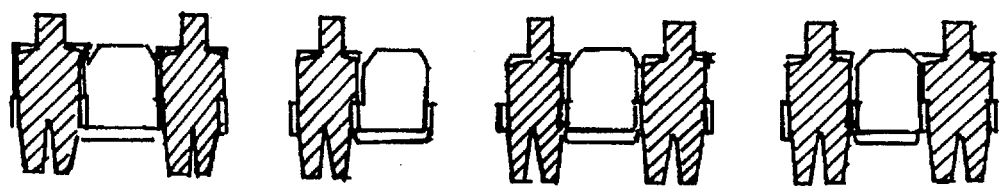

As an example, current efforts to design a very large commercial airplane with a capacity of approximately 600 to 800 seats have resulted in possible designs for airplane fuselages that could accommodate twelve-seat, three-aisle row configurations on the main deck. Current practice determines the 2\4\4\2 configuration to be the ideal such seating configuration since no passenger is more than one seat from the nearest aisle. Using the first procedure of the present invention described earlier, 3\3\3\3 can also be identified as a possible twelve-abreast, three-aisle configuration. When the AUAAP of 2\4\4\2 and 3\3\3\3 configurations are calculated as described previously, 3\3\3\3 is found to provide passengers approximately sixteen (16) square inches more AUAAP than the 2\4\4\2 configuration. As a result, to offer the same total useful area per passenger, if seat pitch is assumed to be thirty-two (32) inches, the seats in the 3\3\3\3 configuration can be made one half (0.5) inch narrower, relative to those in the 2\4\4\2 configuration, resulting in an offsetting sixteen (16) square inch decrease in seat area (32 in. pitch×0.5 in. width=16 square inches). The airplane itself can therefore be made six (6) inches narrower (12 seats×0.5 inches per seat=6 inches) than an airplane configured according to current practice while offering equal total useful area per passenger and therefore equivalent comfort. The total useful area per passenger for a 2\4\4\2 configuration with twenty (20) inch wide seats (18 inch wide seat cushions with 2 inch wide armrests) and a 3\3\3\3 configuration with 19.5 inch wide seats (17.5 inch wide seat cushions with 2 inch wide armrests) is quantified in FIG. 15 using thirty-two (32) inches of seat pitch, the UAA data portrayed in FIG. 7 and the load factor distribution illustrated in FIG. 8.

The present invention also comprises a simplification of the above method for increasing passenger comfort relative to that achieved with the current art with a fixed number of seats and aisles per row in an airplane of fixed dimensions and substantially equal number and type of seats.

The number of seats adjacent to sidewalls and aisles is identical for all possible seat row configurations of a given number of aisles assuming aisles are not positioned adjacent to sidewalls. Thus, as a general rule, in addition to two sidewall seats per row, there are two aisle seats per row for each aisle. In single-aisle airplanes there are two aisle seats per row, in two-aisle airplanes there are four aisle seats per row, in three-aisle airplanes there are six aisle seats per row, and so on.

Positioning aisles adjacent to sidewalls reduces the total number of seats per row adjacent to sidewalls and aisles and is, therefore, avoided. However, where for some reason it is necessary to position an aisle adjacent a sidewall (such as to provide an emergency evacuation path), the methods of the present invention are readily applicable and achieve the objectives of the present invention while the current practice of payloads engineers teaches away from the optimal solution proposed by the present invention.

It has been shown earlier that sidewall and aisle seats adjacent an empty seat are assigned first. All remaining seat assignments are made to seats adjacent other passengers. Thus, with the portion of seats adjacent to a sidewall or aisle in a row with a given number of aisles being a constant for all practical purposes, the portion of passengers in each configuration who will be seated adjacent an empty seat under realistic load factor conditions can be used as a measure of average passenger comfort.

Figure 9A:
FIG. 9A symbolically depicts an 8-abreast, 2\4\2, conventional seating configuration when two seats per row are occupied.
Figure 9B:
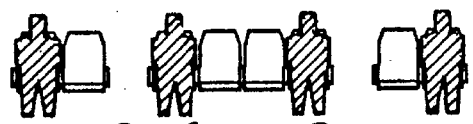
FIG. 9B symbolically depicts a 2\4\2 seating configuration when four seats per row are occupied.
Figure 9C:
FIG. 9C symbolically depicts a 2\4\2 seating configuration when five seats per row are occupied.
Figure 9D:
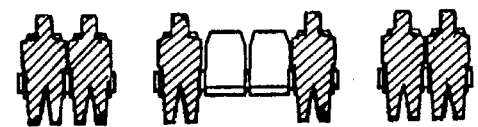
FIG. 9D symbolically depicts a 2\4\2 seating configuration when six seats per row are occupied.
Figure 9E:
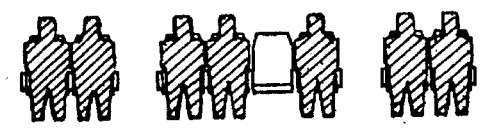
FIG. 9E symbolically depicts a 2\4\2 seating configuration when seven seats per row are occupied.
Figure 9F:
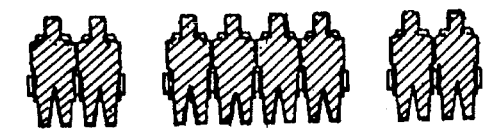
FIG. 9F symbolically depicts a 2\4\2 seating configuration when all eight seats per row are occupied.
Figure 10A:
FIG. 10A symbolically depicts an 8-abreast, 3\2\3 seating configuration of the present invention when two seats per row are occupied.
Figure 10B:
FIG. 10B symbolically depicts a 3\2\3 seating configuration when four seats per row are occupied.
Figure 10D:
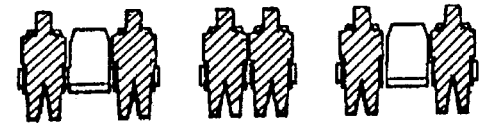
FIG. 10D symbolically depicts a 3\2\3 seating configuration when six seats per row are occupied.
Figure 10E:
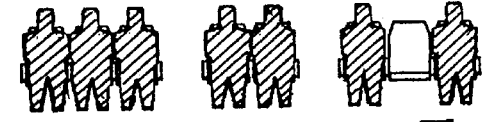
FIG. 10E symbolically depicts a 3\2\3 seating configuration when seven seats per row are occupied.
Figure 10F:
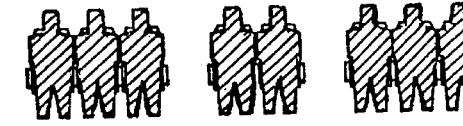
FIG. 10F symbolically depicts a 3\2\3 seating configuration when all eight seats per row are occupied.

The number of passengers who can be seated beside an empty seat is a function of the arrangement of the seats. This can best be illustrated by way of example. Referring again to FIGS. 9–10, wherein two possible configurations for two-aisle, eight-abreast seating are shown. In particular, FIGS. 9–10 are intended in this discussion to exemplify the effect of configuration on the number of passengers who may be seated beside an empty seat at various load factors. FIGS. 9A & 10A represents a load factor of 25%, whereas FIGS. 9F & 10F represent the condition when all seats are filled, i.e., a load factor of 100%. FIGS. 9B–9F: and FIGS. 10B–10E represent equivalent intermediate load factors.

For purposes of comparison, a seating configuration determined in accordance with conventional techniques (2\4\2) is contrasted with a seating configuration obtainable with the method of the present invention, i.e., a 3\2\3 seating configuration. Thus, the conventional configuration is shown in FIGS. 9A, 9B, 9C, 9D, 9E, and 9F and one of the configurations obtainable with the process of the present invention is portrayed in FIGS. 10A, 10B, 10C, 10D, 10E, and 10F.

When four or fewer seats per row are occupied (FIGS. 9A, 9B, 10A and 10B), all passengers can be seated adjacent to an empty seat in the 2\4\2 and 3\2\3 configurations. As the load factor increases (see FIGS. 9C and 10C) and five seats per row are occupied, only three passengers remain seated adjacent to empty seats in the conventional 2\4\2 configuration. In contrast, five passengers are seated next to an empty seat in the 3\2\3 configuration of the present invention. As load factor increases in FIGS. 9D and 10D (six passengers per row), only two passengers can be seated adjacent to an empty seat in the conventional 2\4\2 configuration whereas four passengers can enjoy maximum comfort in the 3\2\3 configuration. When seven passengers are seated per row (FIGS. 9E and 10E), the conventional configuration (2\4\2) and the configuration of the present invention (3\2\3), allow only two passengers to enjoy an empty seat alongside them. When all seats are filled (FIGS. 9F and 10F), no passengers are seated adjacent to empty seats in either configuration.

Thus, while at certain load factors (FIGS. 9A & 10A, 9B & 10B, 9E & 10E and 9F & 10F) both seat configurations provide equal passenger comfort (as measured by an empty seat), the present invention provides superior comfort to passengers flying in the airplane at realistic occupancy conditions, i.e., average load factors. As can be seen from these illustrations, the 3\2\3 configuration obtained using the process of the present invention enjoys an advantage over the conventional 2\4\2 configuration in terms of the number of passengers who are seated beside an empty seat when 5 or 6 seats in an 8 seat row are occupied. This represents load factors of 62.5% and 75%. Other desirable configurations obtainable using the present invention include permutations of the 3\2\3 seating arrangement, i.e., a 3\3\2 and a 2\3\3 seating configuration.

The portion of passengers who can be seated adjacent an empty seat in any configuration can be ascertained using the following formula which takes into account the seat assignment process described earlier and the frequency of occurrence of each load factor.

$$E = \frac{1}{M} \left[ \int_0^{a/s} P(f)(f)\,df + \int_{a/s}^{b/s} P(f)(a/s - (f - a/s))\,df + \int_{b/s}^{c/s} P(f)(g/s)\,df + \int_{c/s}^{1} P(f)(g/s - 2(f - c/s))\,df \right]$$

where:
E=portion of occupied seats which have an empty seat alongside
M=average load factor
f=specific load factor
P(f)=frequency of occurrence of load factor f
S=number of seats per row
z=the number of two-seat units per row
d=the number of three-seat units per row
v=the number of four-seat units per row
q=the number of five-seat units per row
a=z+2(d+v+q); the number of sidewall and aisle seats that can be occupied without seating passengers side by side.
b=a+z; the total number of sidewall and aisle seats
c=b+v+2(q); the total number of seats that can be filled leaving one empty seat in each 3-, 4-, and 5-seat unit
g=2(d+v+q); the total number of passengers who are seated beside empty seats when (only) all sidewall and aisle seats are filled The value of E for 3\2\3, 3\3\2 and 2\3\3 configurations, is greater than E calculated for 2\4\2 configurations for all distributions of load factors, P(f), including positive values for load factors between 0.5 and 0.875. Since average load factors in the commercial aviation industry typically fall between 0.6 and 0.7, all realistic load factor distributions include positive values between 0.5 and 0.875.

The following Chart A illustrates some of the seating configurations attainable using the prior art and the present invention. The present seating configurations shown in Chart A were attained using the above simplified process. These configurations had the higher value for E and can also be shown to have the higher value of AUAAP.

Chart A

| seats per row | current practice | passengers two seats from aisle | present invention | passengers two seats from aisle |
|---|---|---|---|---|
| 8 | 2\4\2 | 0 | 2\3\3, 3\3\2 | 1,1 |
|   |       |   | 3\2\3 | 2 |
| 11 | 2\4\3\2 | 0 | 2\3\3\3 | 1 |
|    | 2\3\4\2 | 0 | 3\3\3\2 | 1 |
|    |         |   | 3\2\3\3 | 2 |
|    |         |   | 3\3\2\3 | 2 |
| 12 | 2\4\4\2 | 0 | 3\3\3\3 | 2 |
| 13 | 2\4\5\2 | 1 | 3\4\3\3 | 2 |
|    | 2\5\4\2 | 1 | 3\3\4\3 | 2 |
|    | 3\4\4\2 | 1 |         |   |
|    | 2\4\4\3 | 1 |         |   |

As can clearly be seen from an examination of Chart A above, conventional payload techniques, which require passengers to be a minimum number of seats away from an aisle (preferably one), teach away from the process of the present invention. In stark contrast to what one would expect to do using conventional techniques, the present invention does not minimize the number of seats between a passenger and the nearest aisle. The present process, however, produces seating configurations fully compliant with applicable FAA regulations. And, as explained above, the seating arrangements contemplated by the present invention are more comfortable for passengers in an airplane of fixed dimensions and seat type at the typical load factors experienced by the airline industry because more passengers are seated next to an empty seat at these load factors.

The seating configurations determined in accordance with the above described process should preferably be applied to a sufficiently large portion of the passenger seats in a particular service class. In doing so the number of passengers who may be seated adjacent an empty seat may be significantly increased. As an example, using the formula for E above it can be determined that thirty (30) percent more passengers can be seated adjacent empty seats when the present 3\2\3 configuration is used throughout the passenger seating area as compared to a conventional 2\4\2 configuration. The superior seating environment of a 3\2\3 configuration can obviously improve the service image of an airline employing the present configuration.

By contrast, for the above Boeing model 747 which has a single row of 3\2\3 seating, only one tenth (0.1) of one percent more passengers can be seated adjacent an empty seat as compared to using the conventional 2\4\2 configuration for that single row. Since this is an insignificant increase, the specially configured Boeing model 747 could not enjoy the useful benefit of the present invention.

What is claimed is:

1. A process for optimizing passenger seating configurations within an airplane having more than one aisle positioned therein, comprising:

(a) identifying the row configurations that can be reasonably accommodated by said airplane;

(b) determining the level of comfort enjoyed by passengers seated in different seating environments within said airplane created by adjacent empty seats, occupied seats, sidewalls, and aisles (environment comfort level);

(c) determining the frequency of occurrence of possible load factor increments;

(d) calculating the average passenger comfort level in said row configurations, using said environment comfort levels, weighted by the portion of passengers that would be seated in each of said seating environments at each said load factor increment, each said load factor increment being weighted by the frequency of occurrence of said load factor increment, and;

(e) installing seats in said airplane in accordance with the seating configuration shown by step (d) to provide the highest average passenger comfort level.

2. The process of claim 1, wherein said average passenger comfort level (APCL) calculated in step (d) is determined in accordance with the following formula:

$$APCL = \frac{1}{M} \left[ \int_0^A P(f) \, WE(f) \, df + \int_A^B P(f) \, (A*WE + (f-A)AE) \, df + \int_B^C P(f) \, [A*WE + (B-A)AE + (f-B)(2AP-AE)] \, df + \int_C^D P(f) \, [A*WE + (B-A)AE + (C-B)(2AP-AE) + (f-C)(AP+WP-WE)] \, df + \int_D^E P(f) \, [A*WE + (B-A)AE + (C-B)(2AP-AE) + (D-C)(AP+WP-WE) + (f-D)(AP+PE-AE)] \, df + \int_E^G P(f) \, [A*WE + (B-A)AE + (C-B)(2AP-AE) + (D-C)(AP+WP-WE) + (E-D)(AP+PE+AE) + (f-E)(2PP+AP-PE-AE)] \, df + \int_G^H P(f) \, [A*WE + (B-A)AE + (C-B)(2AP-AE) + (D-C)(AP+WP-WE) + (E-D)(AP+PE-AE) + (G-E)(2PP+AP-PE-AE) + (f-G)(PP+2AP-2AE)] df + \int_H^K P(f) \, [A*WE + (B-A)AE + (C-B)(2AP-AE) + (D-C)(AP+WP-WE) + (E-D)(AP+PE-AE) + (G-E)(2PP+AP-PE-AE) + (H-G)(PP+2AP-2AE) + (f-H)(AP+PP+WP-AE-WE)] \, df + \int_K^1 P(f) \, [A*WE + (B-A)AE + (C-B)(2AP-AE) + (D-C)(AP+WP-WE) + (E-D)(AP+PE-AE) + (G-E)(2PP+AP-PE-AE) + (H-G)(PP+2AP-2AE) + (K-H)(AP+PP+WP-AE-WE) + (f-K)(CQ+2PP-2PE)] \, df \right]$$

Where:

APCL=average passenger comfort level

M=average load factor f=specific load factor

P(f)=frequency of occurrence of load factor f

WE=environment comfort level for passengers seated between a sidewall and an empty seat AE=environment comfort level for passengers seated between an aisle and an empty seat WP=environment comfort level for passengers seated between a sidewall and another passenger AP=environment comfort level for passengers seated between an aisle and another passenger PE=environment comfort level for passengers seated between an empty seat and another passenger PP=environment comfort level for passengers seated between two other passengers CQ=environment comfort level for passengers seated in the center seat of a full five-seat unit WZ=the total number of outboard (positioned against a sidewall) two-seat units per row (or airplane)

WD=the total number of outboard (positioned against a sidewall) three-seat units per row (or airplane)

CZ=the total number of inboard (positioned between two aisles) two-seat units per row (or airplane)

CD=the total number of inboard (positioned between two aisles) three-seat units per row (or airplane)

CV=the total number of inboard (positioned between two aisles) four-seat units per row (or airplane)

CF=the total number of inboard (positioned between two aisles) five-seat units per row (or airplane)

s=the total number of seats per row (or airplane)

A=(WZ+WD)/s

B=A+[CZ+2(CD+CV+CF)+WD]/s

C=B+CZ/s

D=C+WZ/s

E=D+(CV+2CF)/s

G=E+CV/s

H=G+CD/s

K=H+WD/s.

3. A process for maximizing the comfort of passengers seated in an airplane having fixed dimensions and more than one aisle positioned therein, comprising:

(a) identifying the row configurations that can be reasonably accommodated by said airplane within a selected area;

(b) determining the level of comfort enjoyed by passengers seated in different seating environments created by adjacent occupied seats, empty seats, sidewalls, and aisles (environment comfort level);

(c) determining the frequency of occurrence of possible load factor increments;

(d) calculating the average passenger comfort level in said row configurations, using said environment comfort levels, each of said environment comfort levels being weighted by the portion of passengers that would be seated in each environment at each of said load factor increments, each of said load factor increments being weighted by the frequency of occurrence of said load factor increments and;

(e) installing seats in said airplane in accordance with the seating configuration shown by step (d) to provide the highest average passenger comfort level.

4. The process of claim 3, wherein said average passenger comfort level is determined in accordance with the following formula:

$$APCL = \frac{1}{M} \left[ \int_0^A P(f) \, WE(f) \, df + \int_A^B P(f) \, (A*WE + (f-A)AE) \, df + \int_B^C P(f) \, [A*WE + (B-A)AE + (f-B)(2AP - AE)] \, df + \int_C^D P(f) \, [A*WE + (B-A)AE + (C-B)(2AP - AE) + (f-C)(AP + WP - WE)] \, df + \int_D^E P(f) \, [A*WE + (B-A)AE + (C-B)(2AP - AE) + (D-C)(AP + WP - WE) + (f-D)(AP + PE - AE)] \, df + \int_E^G P(f) \, [A*WE + (B-A)AE + (C-B)(2AP - AE) + (D-C)(AP + WP - WE) + (E-D)(AP + PE + AE) + (f-E)(2PP + AP - PE - AE)] \, df + \int_G^H P(f) \, [A*WE + (B-A)AE + (C-B)(2AP - AE) + (D-C)(AP + WP - WE) + (E-D)(AP + PE - AE) + (G-E)(2PP + AP - PE - AE) + (f-G)(PP + 2AP - 2AE)] \, df + \int_H^K P(f) \, [A*WE + (B-A)AE + (C-B)(2AP - AE) + (D-C)(AP + WP - WE) + (E-D)(AP + PE - AE) + (G-E)(2PP + AP - PE - AE) + (H-G)(PP + 2AP - 2AE) + (f-H)(AP + PP + WP - AE - WE)] \, df + \int_K^1 P(f) \, [A*WE + (B-A)AE + (C-B)(2AP - AE) + (D-C)(AP + WP - WE) + (E-D)(AP + PE - AE) + (G-E)(2PP + AP - PE - AE) + (H-G)(PP + 2AP - 2AE) + (K-H)(AP + PP + WP - AE - WE) + (f-K)(CQ + 2PP - 2PE)] \, df \right]$$

Where:

APCL=average passenger comfort level

M=average load factor (portion of seats occupied)

f=specific load factor

P(f)=frequency of occurrence of load factor f

WE=environment comfort level for passengers seated between a sidewall and an empty seat AE=environment comfort level for passengers seated between an aisle and an empty seat WP=environment comfort level for passengers seated between a sidewall and another passenger AP=environment comfort level for passengers seated between an aisle and another passenger PE=environment comfort level for passengers seated between an empty seat and another passenger PP=environment comfort level for passengers seated between two other passengers CQ=environment comfort level for passengers seated in the center seat of a full five-seat unit WZ=the total number of outboard (positioned against a sidewall) two-seat units per row (or airplane)

WD=the total number of outboard (positioned against a sidewall) three-seat units per row (or airplane)

CZ=the total number of inboard (positioned between two aisles) two-seat units per row (or airplane)

CD=the total number of inboard (positioned between two aisles) three-seat units per row (or airplane)

CV=the total number of inboard (positioned between two aisles) four-seat units per row (or airplane)

CF=the total number of inboard (positioned between two aisles) five-seat units per row (or airplane)

s=the total number of seats per row (or airplane)

A=(WZ+WD)/s

B=A+[CZ+2(CD+CV+CF)+WD]/s
C=B+CZ/s
D=C+WZ/s
E=D+(CV+2CF)/s
G=E+CV/s
H=G+CD/s
K=H+WD/s.

5. A process for maximizing passenger comfort in an airplane having a fixed number of seats and aisles per row comprising:
   (a) identifying the possible row configurations for a given number of seats and aisles;
   (b) determining the frequency of occurrence of possible load factor increments;
   (c) calculating the portion of passengers who can be seated alongside an empty seat in said row configurations in said load factor increments, and;
   (d) selecting the row configuration allowing the greatest number of passengers to be seated next to an empty seat at typical load factors, and;
   (e) installing seats in said airplane in accordance with said selected row configurations.

6. The process of claim 5, wherein said portion of passengers is determined in accordance with the following formula:

$$E = \frac{1}{M}\left[\int_0^{a/s} P(f)(f)\,df + \int_{a/s}^{b/s} P(f)(a/s - (f - a/s))\,df + \int_{b/s}^{c/s} P(f)(g/s)\,df + \int_{c/s}^{1} P(f)(g/s - 2(f - c/s))\,df\right]$$

where:
   =portion of passengers who can be seated alongside an empty seat
   M=average load factor
   f=specific load factor
   P(f)=frequency of occurrence of load factor f
   s=number of seats per row
   z=the number of two-seat units per row
   d=the number of three-seat units per row
   v=the number of four-seat units per row
   q=the number of five-seat units per row
   a=z+2(d+v+q); the number of sidewall and aisle seats that can be occupied without seating passengers side by side
   b=a+z; the total number of sidewall and aisle seats
   c=b+v+2(q); the total number of seats that can be filled leaving one empty seat in each 3-, 4-, and 5-seat unit
   g=2(d+v+q); the total number of passengers who are seated beside empty seats when (only) all sidewall and aisle seats are filled.

7. In an airplane of fixed dimensions, having a fuselage with two side walls, a plurality of passenger seats, only two aisles and eight abreast seating, a seating configuration distributed substantially within the seating area for a particular passenger service class for maximizing passenger comfort at average load factors, comprising:
   (a) a two seat unit positioned between a first side wall of the airplane and a first aisle closest to said first side wall,
   (b) a three seat unit positioned between said first aisle and the second aisle, and
   (c) another three seat unit positioned between said second aisle and the other side wall of said airplane.

8. A process for increasing the likelihood that a passenger seated within an airplane operating at typical load factors will be seated next to an empty seat, said airplane having fixed dimensions, two side walls, eleven abreast seating, and only three aisles, said process comprising:
   a. positioning a three seat unit within said airplane between a first side wall and a first aisle closest to said first side wall,
   b. positioning a two seat unit within said airplane between said first aisle and the second aisle,
   c. positioning another three seat unit within said airplane between said second aisle and the third aisle,
   d. positioning a third three seat unit between said third aisle and the other side wall of said airplane, and
   e. seating passengers first in seats closest to each of said side walls and seats closest to said aisles, that are adjacent to an empty seat, until all such seats are occupied with passengers and seating passengers second in any remaining aisle seats.

9. In an airplane of fixed dimensions, having a fuselage with two side walls, a plurality of passenger seats, only three aisles and eleven abreast seating, a seating configuration comprising:
   (a) a two seat unit positioned between a first side wall of the airplane and a first aisle closest to said first side wall,
   (b) a first three seat unit positioned between said first aisle and the second aisle,
   (c) a second three seat unit positioned between said second aisle and the third aisle, and
   (d) a third three seat unit positioned between said third aisle and the other side wall of said airplane.

10. A process for increasing the likelihood that a passenger seated within an airplane operating at typical average load factors will be seated next to an empty seat, said airplane having fixed dimensions, two side walls, twelve abreast seating, and only three aisles, said process comprising:
   a. positioning a three seat unit within said airplane between a first side wall and a first aisle closest to said first side wall,
   b. positioning a second three seat unit within said airplane between said first aisle and the second aisle,
   c. positioning a third three seat unit within said airplane between said second aisle and the third aisle,
   d. positioning a fourth three seat unit between said third aisle and the other side wall of said airplane, and
   e. seating passengers first in seats closest to each of said side walls and seats closest to said aisles, that are adjacent to an empty seat, until all such seats are occupied with passengers and seating passengers second in any remaining aisle seats.

11. In an airplane of fixed dimensions, having a fuselage with two side walls, a plurality of passenger seats, only three aisles and twelve abreast seating, a seating configuration comprising:
   (a) a first three seat unit positioned between a first side wall of the airplane and a first aisle closest to said side wall,
   (b) a second three seat unit positioned between said first aisle and the second aisle,
   (c) a third three seat unit positioned between said second aisle and the third aisle, and (d) a fourth three seat unit positioned between said third aisle and the other side wall of said airplane.

12. In an airplane of fixed dimensions, having a fuselage with two side walls, a plurality of passenger seats, only three aisles and thirteen abreast seating, a seating configuration comprising:

(a) a first three seat unit positioned between a first side wall of the airplane and a first aisle closest to said first side wall, (b) a four seat unit positioned between said first aisle and the second aisle, (c) a second three seat unit positioned between said second aisle and the third aisle, and (d) a third three seat unit positioned between said third aisle and the other side wall of said airplane.

13. A process for maximizing the number of passenger seats in a multi-aisle airplane of fixed dimensions and seat type while substantially maintaining original passenger comfort levels at substantially the same load factors, comprising:

(a) identifying the row configurations that can be reasonably accommodated by said airplane;

(b) determining the spatial equivalent of the additional comfort enjoyed by passengers in different seating environments created by adjacent occupied seats, empty seats, sidewalls and aisles (environment spatial equivalent);

(c) determining the frequency of occurrence of possible load factor increments;

(d) calculating the average spatial equivalent in said row configurations, using said environment spatial equivalents, weighted by the portion of passengers that would be seated in each of said seating environments at each said load factor increment, each said load factor increment being weighted by the frequency of occurrence of said load factor increment;

(e) selecting the row configuration providing the highest average spatial equivalent;

(f) selecting a seat width and seat pitch, one or both reduced to the desired extent allowed by said selected row configuration;

(g) installing seats in said airplane in accordance with said selected row configuration and said selected seat width and seat pitch;

(h) installing additional seats in the area made available by the reductions in seat pitch and/or seat width implemented in step (g).

14. The process of claim 13, wherein said environment spatial equivalents are calculated in accordance with the following formula;

$$ESE_X = B_X - C \div \frac{D-E}{F-G}$$

Where:

$ESE_X$=environment spatial equivalent for seating environment X and from a survey of passengers with identical seat area (seat width×seat pitch)

$B_X$=average reported comfort of passengers in seating environment X

C=average reported comfort of passengers seated between two other passengers and from a survey of passengers with different amounts of seat area:

D=average reported comfort of passengers with most seat area

E=average reported comfort of passengers with least area

F=seat area of passengers with most seat area

G=seat area of passengers with least seat area.

15. The process of claim 14, wherein said average spatial equivalent is calculated in accordance with the following formula:

$$\begin{aligned}
ASE = \frac{1}{M} \Bigg[ &\int_0^A P(f) \, WE(f) \, df + \int_A^B P(f) \, (A * WE + \\
& (f-A) AE) \, df + \int_B^C P(f) \, [A*WE + (B-A)AE + \\
& (f-B)(2AP - AE)] \, df + \int_C^D P(f) \, [A*WE + (B-A)AE + \\
& (C-B)(2AP - AE) + (f-C)(AP + WP - WE)] \, df + \\
& \int_D^E P(f) \, [A*WE + (B-A)AE + (C-B)(2AP - AE) + \\
& (D-C)(AP + WP - WE) + (f-D)(AP + PE - AE)] \, df + \\
& \int_E^G P(f) \, [A*WE + (B-A)AE + (C-B)(2AP - AE) + \\
& (D-C)(AP + WP - WE) + (E-D)(AP + PE + AE) + \\
& (f-E)(2PP + AP - PE - AE)] \, df + \int_G^H P(f) \, [A*WE + \\
& (B-A)AE + (C-B)(2AP - AE) + (D-C)(AP + \\
& WP - WE) + (E-D)(AP + PE - AE) + (G-E)(2PP + \\
& AP - PE - AE) + (f-G)(PP + 2AP - 2AE)] df + \\
& \int_H^K P(f) \, [A*WE + (B-A)AE + (C-B)(2AP - AE) + \\
& (D-C)(AP + WP - WE) + (E-D)(AP + PE - AE) + \\
& (G-E)(2PP + AP - PE - AE) + (H-G)(PP + 2AP - \\
& 2AE) + (f-H)(AP + PP + WP - AE - WE)] \, df + \\
& \int_K^1 P(f) \, [A*WE + (B-A)AE + (C-B)(2AP - AE) + \\
& (D-C)(AP + WP - WE) + (E-D)(AP + PE - AE) + \\
& (G-E)(2PP + AP - PE - AE) + (H-G)(PP + 2AP - \\
& 2AE) + (K-H)(AP + PP + WP - AE - WE) + \\
& (f-K)(CQ + 2PP - 2PE)] \, df \Bigg]
\end{aligned}$$

Where:

ASE=average spatial equivalent

M=average load factor f=specific load factor

P(f)=frequency of occurrence of load factor f

WE=environment spatial equivalent for passengers seated between a sidewall and an empty seat AE=environment spatial equivalent for passengers seated between an aisle and an empty seat WP=environment spatial equivalent for passengers seated between a sidewall and another passenger AP=environment spatial equivalent for passengers seated between an aisle and another passenger PE=environment spatial equivalent for passengers seated between an empty seat and another passenger PP=environment spatial equivalent for passengers seated between two other passengers CQ=environment spatial equivalent for passengers seated in the center seat of a full five-seat unit WZ=the total number of outboard (positioned against a sidewall) two-seat units per row (or airplane)

WD=the total number of outboard (positioned against a sidewall) three-seat units per row (or airplane)

CZ=the total number of inboard (positioned between two aisles) two-seat units per row (or airplane)

CD=the total number of inboard (positioned between two aisles) three-seat units per row (or airplane)

CV=the total number of inboard (positioned between two aisles) four-seat units per row (or airplane)

CF=the total number of inboard (positioned between two aisles) five-seat units per row (or airplane)

s=the total number of seats per row (or airplane)

A=(WZ+WD)/s

B=A+[CZ+2(CD+CV+CF)+WD]/s

C=B+CZ/s

D=C+WZ/s

E=D+(CV+2CF)/s

G=E+CV/s

H=G+CD/s

K=H+WD/s.

16. A process for minimizing the dimensions of an airplane accommodating substantially the same number of passengers at substantially the same load factors at substantially the same original comfort levels with the same seat type, comprising:

(a) identifying the row configurations that can be reasonably accommodated by said airplane;

(b) determining the spatial equivalent of the additional comfort enjoyed by passengers in different seating environments created by adjacent occupied seats, empty seats, sidewalls and aisles;

(c) determining the frequency of occurrence of possible load factor increments;

(d) calculating the average spatial equivalent in said row configurations, using said environment spatial equivalents, weighted by the portion of passengers that would be seated in each of said seating environments at each said load factor increment, each said load factor increment being weighted by the frequency of occurrence of said load factor increment;

(e) selecting the row configuration providing the highest average spatial equivalent;

(f) selecting a seat width and seat pitch, one or both reduced to the desired extent allowed by said selected row configuration;

(g) installing seats in said airplane in accordance with said selected row configuration and said selected seat width and seat pitch; and (h) reducing the overall dimensions of the airplane, absorbing some or all of the area resulting from the reductions in seat width and/or seat pitch implemented step (g).

17. The process of claim 16, wherein said environment spatial equivalent is calculated in accordance with the following formula;

$$ESE_X = B_X - C \div \frac{D - E}{F - G}$$

Where:

$ESE_X$=environment spatial equivalent for seating environment X and from a survey of passengers with identical seat area (seat width×seat pitch)

$B_X$=average reported comfort of passengers in seating environment X

C=average reported comfort of passengers seated between two other passengers and from a survey of passengers with different amounts of seat area:

D=average reported comfort of passengers with most seat area

E=average reported comfort of passengers with least area

F=seat area of passengers with most seat area

G=seat area of passengers with least seat area.

18. The process of claim 17, wherein said average spatial equivalent is calculated in accordance with the following formula:

$$ASE = \frac{1}{M} \left[ \int_0^A P(f) \, WE(f) \, df + \int_A^B P(f) \, (A * WE + \right.$$

$$(f - A) AE) \, df + \int_B^C P(f) \, [A*WE + (B - A)AE +$$

$$(f - B) (2AP - AE)] \, df + \int_C^D P(f) \, [A*WE + (B - A)AE +$$

$$(C - B) (2AP - AE) + (f - C) (AP + WP - WE)] \, df +$$

$$\int_D^E P(f) \, [A*WE + (B - A)AE + (C - B) (2AP - AE) +$$

$$(D - C) (AP + WP - WE) + (f - D) (AP + PE - AE)] \, df +$$

$$\int_E^G P(f) \, [A*WE + (B - A)AE + (C - B) (2AP - AE) +$$

$$(D - C) (AP + WP - WE) + (E - D) (AP + PE + AE) +$$

$$(f - E) (2PP + AP - PE - AE)] \, df + \int_G^H P(f) \, [A*WE +$$

$$(B - A)AE + (C - B) (2AP - AE) + (D - C) (AP +$$

$$WP - WE) + (E - D) (AP + PE - AE) + (G - E) (2PP +$$

$$AP - PE - AE) + (f - G) (PP + 2AP - 2AE)] df +$$

$$\int_H^K P(f) \, [A*WE + (B - A)AE + (C - B) (2AP - AE) +$$

$$(D - C) (AP + WP - WE) + (E - D) (AP + PE - AE) +$$

$$(G - E) (2PP + AP - PE - AE) + (H - G) (PP + 2AP -$$

-continued $$2AE) + (f - H)(AP + PP + WP - AE - WE)]\, df +$$

$$\int_K^1 P(f)\,[A*WE + (B - A)AE + (C - B)(2AP - AE) +$$

$$(D - C)(AP + WP - WE) + (E - D)(AP + PE - AE) +$$

$$(G - E)(2PP + AP - PE - AE) + (H - G)(PP + 2AP -$$

$$2AE) + (K - H)(AP + PP + WP - AE - WE) +$$

$$(f - K)(CQ + 2PP - 2PE)]\, df \Bigg]$$

Where:

ASE=average spatial equivalent

M=average load factor f=specific load factor

P(f)=frequency of occurrence of load factor f

WE=environment spatial equivalent for passengers seated between a sidewall and an empty seat AE=environment spatial equivalent for passengers seated between an aisle and an empty seat WP=environment spatial equivalent for passengers seated between a sidewall and another passenger AP=environment spatial equivalent for passengers seated between an aisle and another passenger PE=environment spatial equivalent for passengers seated between an empty seat and another passenger PP=environment spatial equivalent for passengers seated between two other passengers CQ=environment spatial equivalent for passengers seated in the center seat of a full five-seat unit WZ=the total number of outboard (positioned against a sidewall) two-seat units per row (or airplane)

WD=the total number of outboard (positioned against a sidewall) three-seat units per row (or airplane)

CZ=the total number of inboard (positioned between two aisles) two-seat units per row (or airplane)

CD=the total number of inboard (positioned between two aisles) three-seat units per row (or airplane)

CV=the total number of inboard (positioned between two aisles) four-seat units per row (or airplane)

CF=the total number of inboard (positioned between two aisles) five-seat units per row (or airplane)

s=the total number of seats per row (or airplane)

A=(WZ+WD)/s

B=A+[CZ+2(CD+CV+CF)+WD]/s

C=B+CZ/s

D=C+WZ/s

E=D+(CV+2CF)/s

G=E+CV/s

H=G+CD/s

K=H+WD/s.

19. A process for increasing the likelihood that a passenger seated within an airplane operating at typical average load factors will be seated next to an empty seat, said airplane having fixed dimensions, two side walls, thirteen abreast seating, and only three aisles, said process comprising:

a. positioning a three seat unit within said airplane between a first side wall and a first aisle closest to said first side wall closest to said first side wall, b. positioning a four seat unit within said airplane between said first aisle and the second aisle, c. positioning a second three seat unit within said airplane between said second aisle and the third aisle, d. positioning a third three seat unit between said third aisle and the other side wall of said airplane, and e. seating passengers first in seats closest to each of said side walls and seats closest to said aisles, that are adjacent to an empty seat, until all such seats are occupied with passengers and seating passengers second in any remaining aisle seats.

20. In an airplane of fixed dimensions, having a fuselage with two exterior side walls, a plurality of passenger seats, only three aisles, and eleven abreast seating, a seating configuration comprising:

(a) a first three seat unit positioned between a first side wall of the airplane and a first aisle closest to said first side wall, (b) a two seat unit positioned between said first aisle and the second aisle, (c) a second three seat unit positioned between said second aisle and the third aisle, and (d) a third three seat united positioned between said third aisle and the other side wall of said airplane.

21. A process for increasing the likelihood that a passenger seated within an airplane operating at typical load factors will be seated next to an empty seat, said airplane having fixed dimensions, two side walls, eight abreast seating, and only two aisles, said process comprising:

a. positioning a three seat unit within said airplane between a first side wall and a first aisle closest to said first side wall, b. positioning a two seat unit within said airplane between said first aisle and the second aisle, c. positioning another three seat unit within said airplane between said second aisle and the other side wall, and d. seating passengers first in seats closest to each of said side walls and seats closest to said aisles, that are adjacent to an empty seat, until all such seats are occupied with passengers and seating passengers second in any remaining aisle seats.

22. A process for increasing the likelihood that a passenger seated within an airplane operating at typical load factors will be seated next to an empty seat, said airplane having fixed dimensions, two side walls, eight abreast seating, and only two aisles, said process comprising:

a. positioning a two seat unit within said airplane between a first side wall and a first aisle closest to said first side wall, b. positioning a three seat unit within said airplane between said first aisle and the second aisle, c. positioning another three seat unit within said airplane between said second aisle and the other side wall, and d. seating passengers first in seats closest to each of said side walls and seats closest to said aisles, that are adjacent to an empty seat, until all such seats are occupied with passengers and seating passengers second in any remaining aisle seats.

23. A process for increasing the likelihood that a passenger seated within an airplane operating at typical load factors will be seated next to an empty seat, said airplane having fixed dimensions, two side walls, eleven abreast seating, and only three aisles, said process comprising:

a. positioning a two seat unit within said airplane between a first side wall and a first aisle closest to said first side wall, b. positioning a three seat unit within said airplane between said first aisle and the second aisle, c. positioning another three seat unit within said airplane between said second aisle and the third aisle, d. positioning a third three seat unit between said third aisle and the other side wall of said airplane, and e. seating passengers first in seats closest to each of said side walls and seats closest to said aisles, that are adjacent to an empty seat, until all such seats are occupied with passengers and seating passengers second in any remaining aisle seats.

* * * * *